United States Patent [19]

Higashimata et al.

[11] Patent Number: 5,660,449

[45] Date of Patent: Aug. 26, 1997

[54] BRAKING FORCE CONTROL APPARATUS

[75] Inventors: Akira Higashimata, Hadano; Junji Tsutsumi, Isehara; Ken Ito, Machida, all of Japan

[73] Assignee: Nissan Motor Co., Ltd., Yokohama, Japan

[21] Appl. No.: 637,393

[22] Filed: Apr. 25, 1996

[30] Foreign Application Priority Data

Apr. 28, 1995 [JP] Japan .................. 7-106369

[51] Int. Cl.$^6$ .................................. B60T 8/58
[52] U.S. Cl. ............. 303/156; 303/157; 364/426.027
[58] Field of Search ............................ 303/156, 157, 303/158, 113.1, 119.1, 119.2; 364/426.02; 251/121, 210, 129.05, 129.08

[56] References Cited

U.S. PATENT DOCUMENTS

| | | | |
|---|---|---|---|
| 4,898,361 | 2/1990 | Bender et al. ............... | 251/129.08 X |
| 5,303,988 | 4/1994 | Okubo ........................... | 303/156 |
| 5,328,254 | 7/1994 | Youngblood .................. | 303/156 X |
| 5,462,253 | 10/1995 | Asthana et al. ............... | 251/129.08 X |
| 5,571,248 | 11/1996 | Seetharaman et al. ....... | 251/129.08 X |

*Primary Examiner*—Lee W. Young
*Attorney, Agent, or Firm*—Foley & Lardner

[57] ABSTRACT

A braking force control apparatus for use with an automotive vehicle supported on road wheels each of which has a wheel cylinder for applying a braking force to the corresponding road wheel in response to a fluid pressure introduced thereto. The fluid pressure is controlled by a solenoid valve which is movable between open and closed positions in response to a control signal having a variable duty ratio. The duty ratio of the control signal is changed at predetermined intervals of time to move the solenoid valve in a plurality of steps toward the closed position.

5 Claims, 17 Drawing Sheets

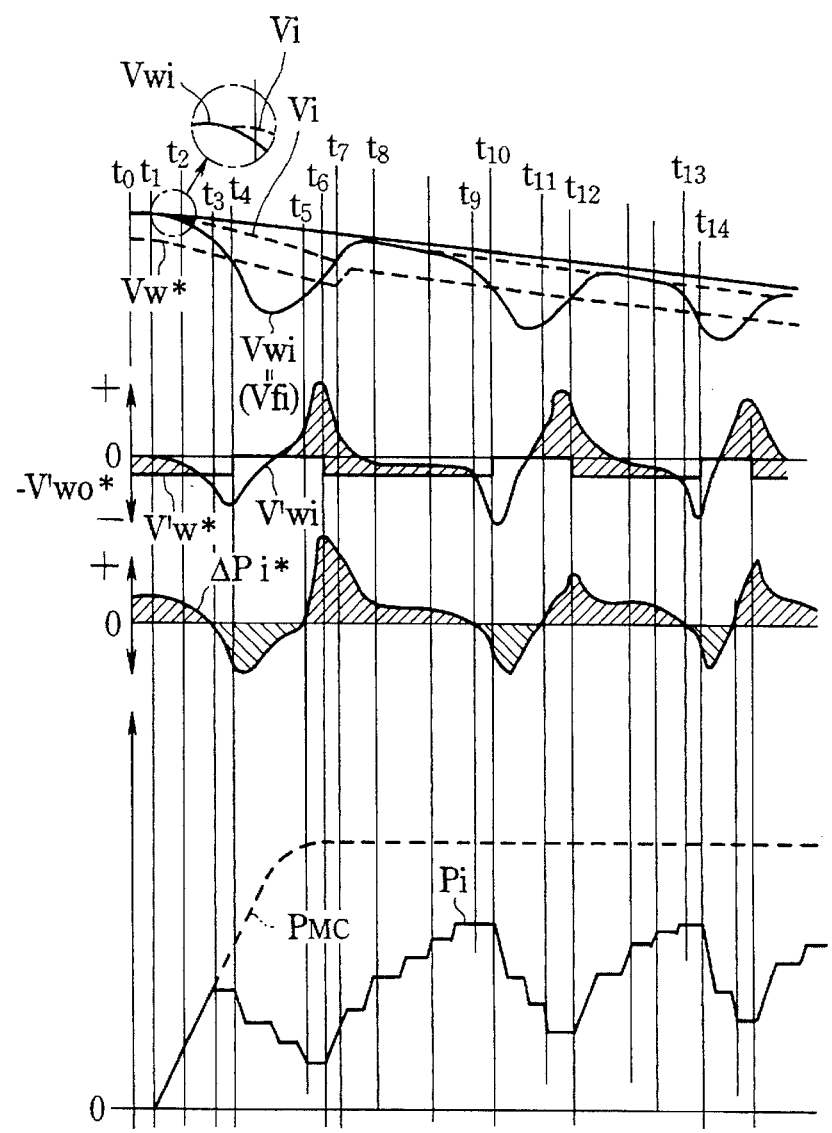

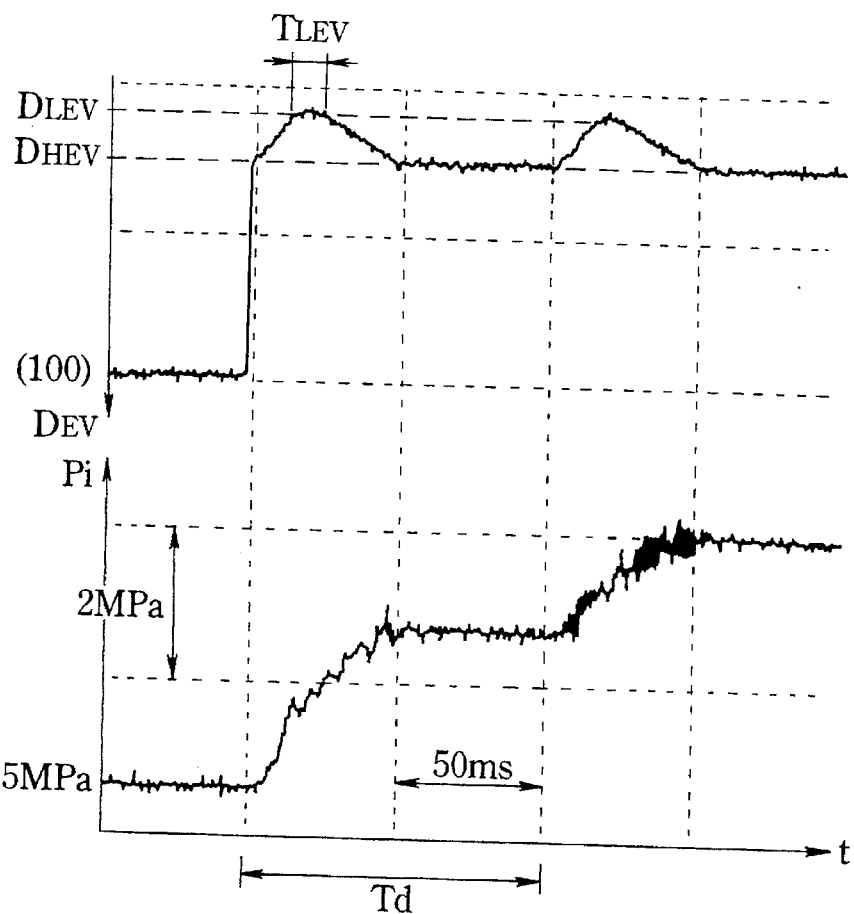

BRAKING FORCE CONTROL APPARATUS

BACKGROUND OF THE INVENTION

This invention relates to a braking force control apparatus for use with an automotive vehicle.

A wheel cylinder is provided for each of the road wheels on which an automotive vehicle is supported. The braking force applied to the road wheel has been controlled with the use of a solenoid valve(s) operable on electric current having a rectangular waveform to move between its open and closed positions to control the fluid pressure introduced into the wheel cylinder. One problem associated with such electric current is great pulsations which occur particularly when the solenoid valve closes to produce great wheel cylinder pressure fluctuations. The wheel cylinder pressure fluctuations causes vibrations to be transmitted to the vehicle body, as will be described in detail. It is the conventional practice to avoid the disadvantageous wheel cylinder pressure fluctuations by employing an expensive flow control device such as an orifice or damper with the solenoid valve. However, the use of such a flow control device results in a slow braking force control response.

SUMMARY OF THE INVENTION

Therefore, it is a main object of the invention to provide an improved braking force control apparatus which has a fast braking force control response without any great wheel cylinder pressure pulsations.

There is provided, in accordance with the invention, a braking force control apparatus for use with an automotive vehicle supported on road wheels each of which has a wheel cylinder for applying a braking force to the corresponding road wheel in response to a fluid pressure introduced thereto. The braking force control apparatus comprises at least one solenoid valve movable between open and closed positions in response to a control signal having a variable duty ratio for controlling the fluid pressure introduced to the wheel cylinder, sensor means for sensing a road wheel slip condition, and a control unit for controlling the solenoid valve based on the sensed road wheel slip condition. The control unit includes means for changing the duty ratio of the control signal at predetermined intervals of time to move the solenoid valve in a plurality of steps toward the closed position during a valve closing mode.

BRIEF DESCRIPTION OF THE DRAWINGS

The invention will be described in greater detail by reference to the following description taken in connection with the accompanying drawings, in which:

FIGS. 11A, 11B, 11C and 11D are graphs used in explaining the wheel cylinder pressure control made by the braking force control apparatus of FIG. 1;

FIG. 12A is a graph showing the first solenoid valve duty ratio variations;

FIG. 12B is a graph showing the wheel cylinder pressure variations made with the first solenoid valve duty ratio variations shown in FIG. 12A;

DETAILED DESCRIPTION OF THE INVENTION

Figure 1:
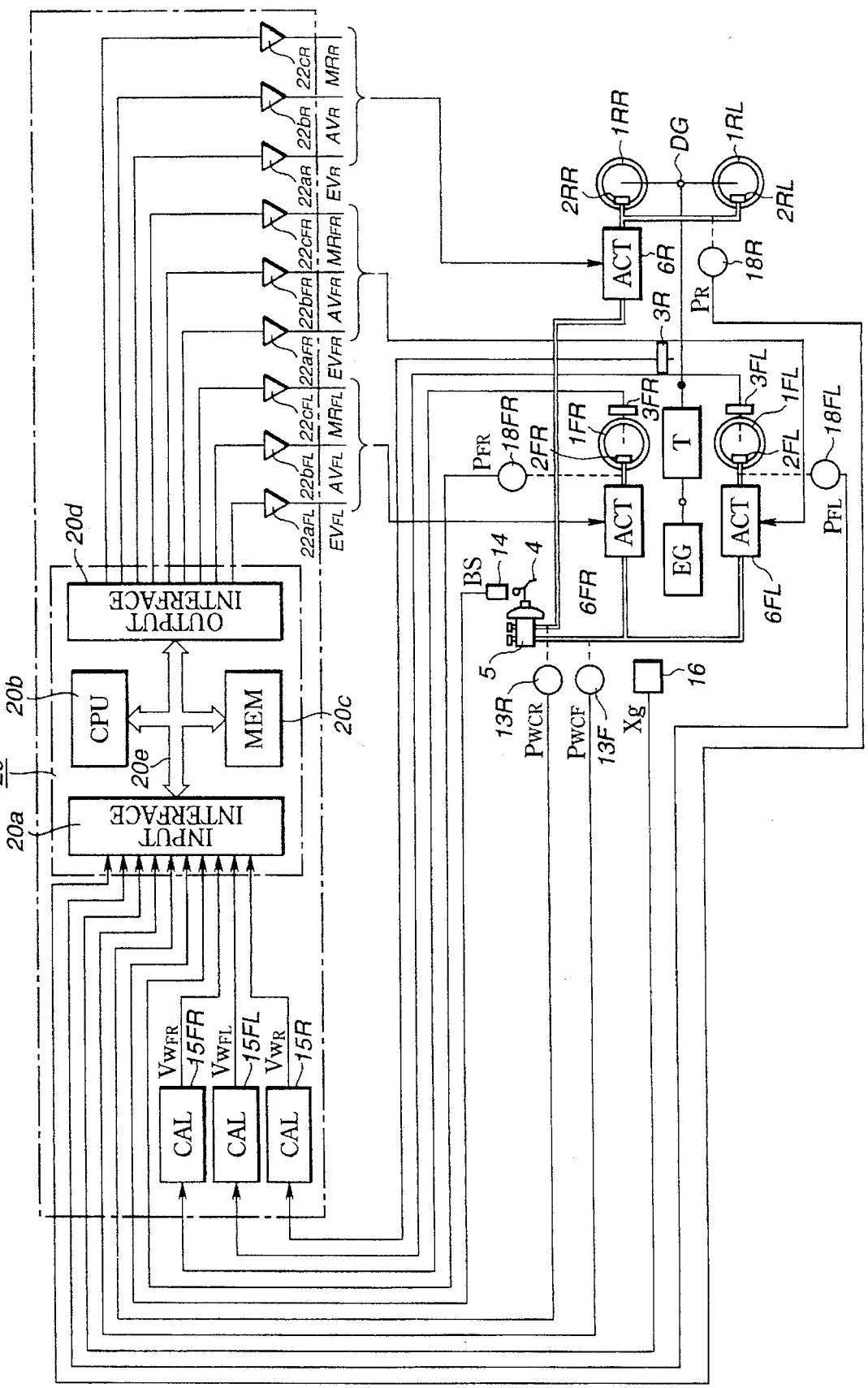
FIG. 1 is a schematic diagram showing one embodiment of a braking force control apparatus made in accordance with the invention.

With reference to the drawings, and in particularly to FIG. 1, there is shown a schematic diagram of a braking force control apparatus embodying the invention. The invention will be described in connection with an antiskid control apparatus applied to an FR (front-engine, rear-drive) type automotive vehicle supported on a pair of front road wheels 1FL and 1FR and a pair of rear road wheels 1RL and 1RR. A drive is transmitted from an engine EG to the rear wheels 1RL and 1RR through a transmission T, a propeller shaft PS and a differential gear DG. The front wheels 1FL and 1FR are associated with respective wheel cylinders 2FL and 2FR which are situated in front wheel brakes for application of brakes to the respective front road wheels 1FL and 1FR. The rear wheels 1RL and 1RR are associated with respective wheel cylinders 2RL and 2RR which are situated in rear wheel brakes for application of brakes to the respective rear road wheels 1RL and 1RR. The numeral 4 designates a brake pedal which is operated by the operator to actuate the piston in a tandem master cylinder 5 so as to force fluid to actuators 6FL, 6FR and 6R. These actuators have substantially the same structure. The actuators 6FL and 6FR receive a master cylinder pressure $P_{MCF}$ introduced thereto from the master cylinder 5 to apply controlled braking forces to the respective front road wheels 1FL and 1FR. The actuator 6R receives a master cylinder pressure $P_{MCR}$ introduced thereinto from the master cylinder 5 to apply controlled braking forces to the rear road wheels 1RL and 1RR. The master cylinder pressures $P_{MCF}$ and $P_{MCR}$ correspond to the degree to which the brake pedal 4 is depressed.

Figure 2:
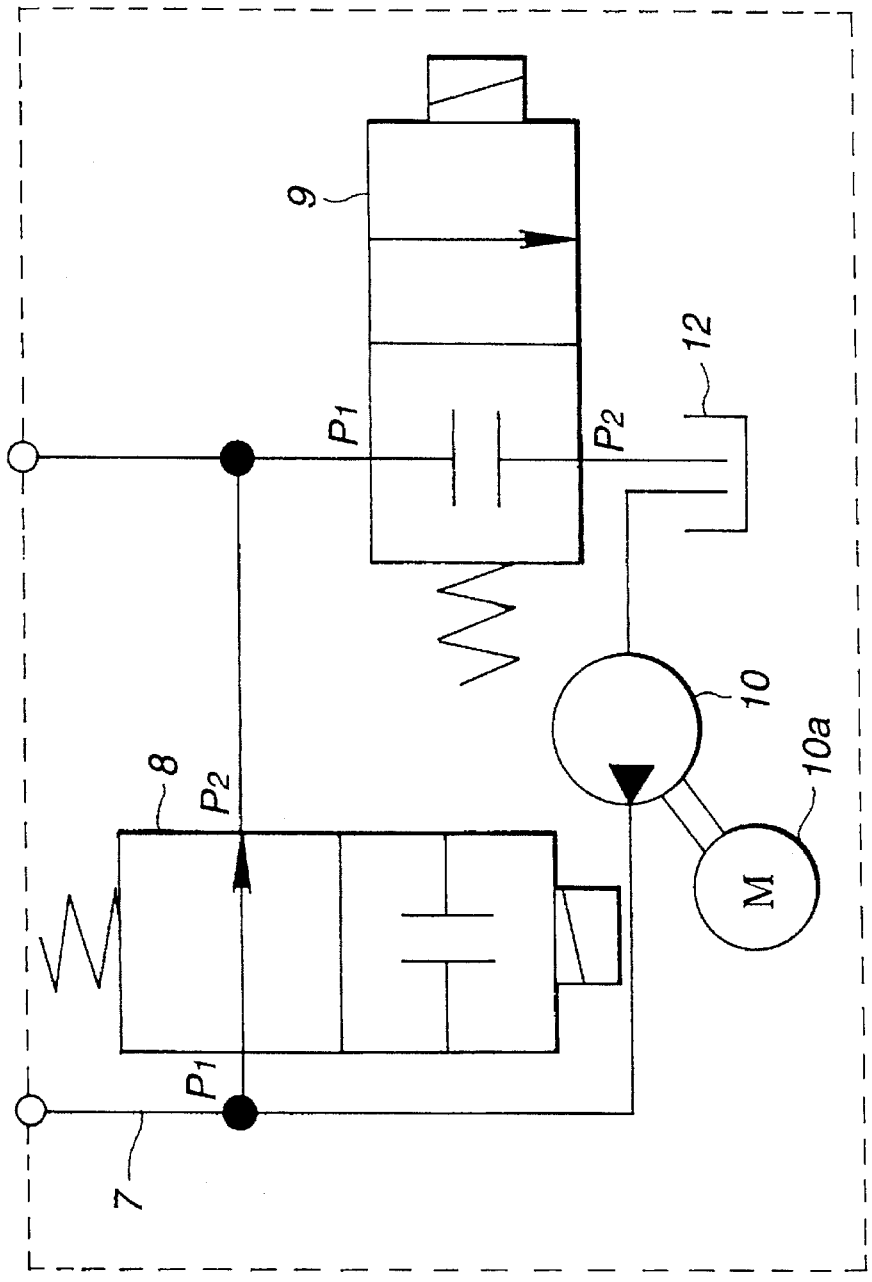
FIG. 2 is a schematic diagram showing a wheel cylinder pressure control actuator used in the braking force control apparatus of FIG. 1.

Referring to FIG. 2, each of the actuators 6FL, 6FR and 6R includes first and second solenoid valves 8 and 9. The first solenoid valve 8 has inlet and outlet ports 8P1 and 8P2. The inlet port 8P1 is connected through a conduit 7 to the master cylinder 5 and also to a reservoir 12 through a pump 10 driven by an electric motor 10a. The reservoir 12 acts as an accumulator. The outlet port 8P1 is connected to the corresponding wheel cylinder. The first solenoid valve 8 operates on a control signal in the form of electric current fed thereto from a control unit to be described later to occupy one of two positions. The first or open position, illustrated in FIG. 2, is occupied in the absence of the control signal to provide communication between the ports 8P1 and 8P2 so as to increase the fluid pressure introduced to the corresponding wheel cylinder. The second or closed position is encountered in the presence of the control signal to interrupt the communication between the ports 8P1 and 8P2 so as to hold the fluid pressure in the corresponding wheel cylinder. The second solenoid valve 9 has inlet and outlet ports 9P1 and 9P2. The inlet port 9P1 is connected to the outlet port 8P2 of the first solenoid valve 8. The output port 9P2 is connected to the reservoir 12. The second solenoid valve 9 operates on a control signal fed thereto from the control unit to occupy one of two positions. The first or closed position, illustrated in FIG. 2, is occupied in the absence of the control signal to interrupt communication between the ports 9P1 and 9P2 so as to hold the fluid pressure in the corresponding wheel cylinder. The second or open position is encountered in the presence of the control signal to provide the communication between the ports 9P1 and 9P2 so as to decrease the fluid pressure introduced into the corresponding wheel cylinder.

Figure 3A:
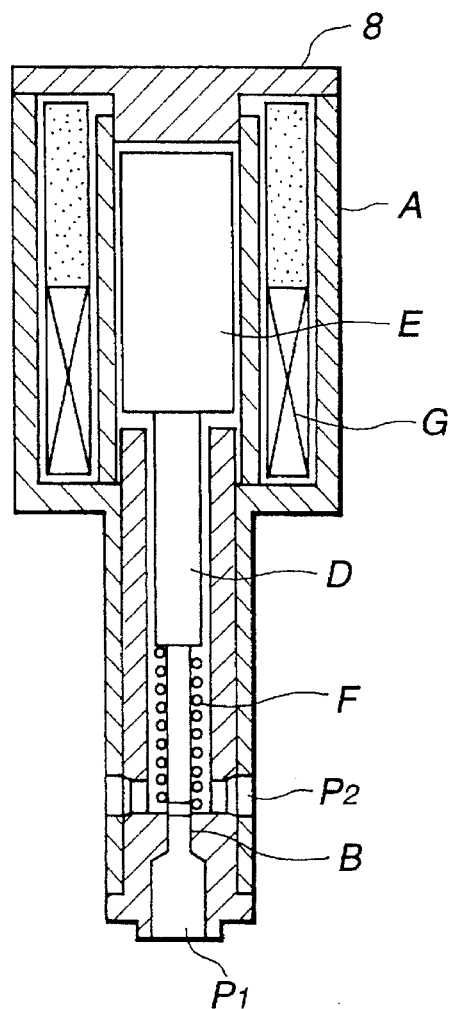
FIG. 3A is an enlarged sectional view showing one example of the solenoid valve used in the braking force control apparatus.
Figure 3B:
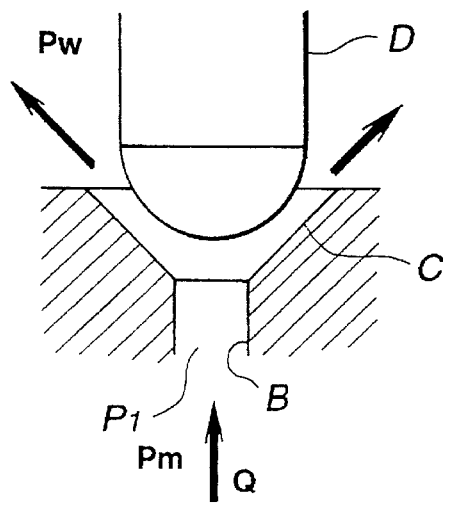
FIG. 3B is an enlarged sectional view showing a significant portion of the solenoid valve of FIG. 3A.

Referring to FIG. 3A, there is shown the detailed structure of the first solenoid valve 8. The solenoid valve 8 includes a housing A having an orifice B which terminates in a valve seat C, as best shown in FIG. 3B. A plunger D has an armature E formed at its rearward ends and it is supported within the housing A for reciprocation between a fully-open position and a fully-closed position. In the fully-open position, the forward end of the plunger D is spaced from the orifice D to permit fluid flow from the inlet port P1 to the outlet port P2, and in the fully-closed position, the forward end of the plunger D is closed against the orifice B to block the fluid flow from the inlet port P1 to the outlet port P2. A bias spring F is seated between the rear ward end of the plunger D and the valve seat C to bias the plunger D toward its open position. An electric winding G is electromagnetically coupled with the plunger D. When the electrical winding G is energized by the presence of electrical current within it, the plunger D moves toward the fully-closed position. The duty cycle of the electrical pulse signal applied to the electrical winding G controls the flow of fluid introduced from the inlet port P1 to the outlet port P2 and thus determines the fluid pressure discharged from the outlet port P2.

Figures 4A, 4B:
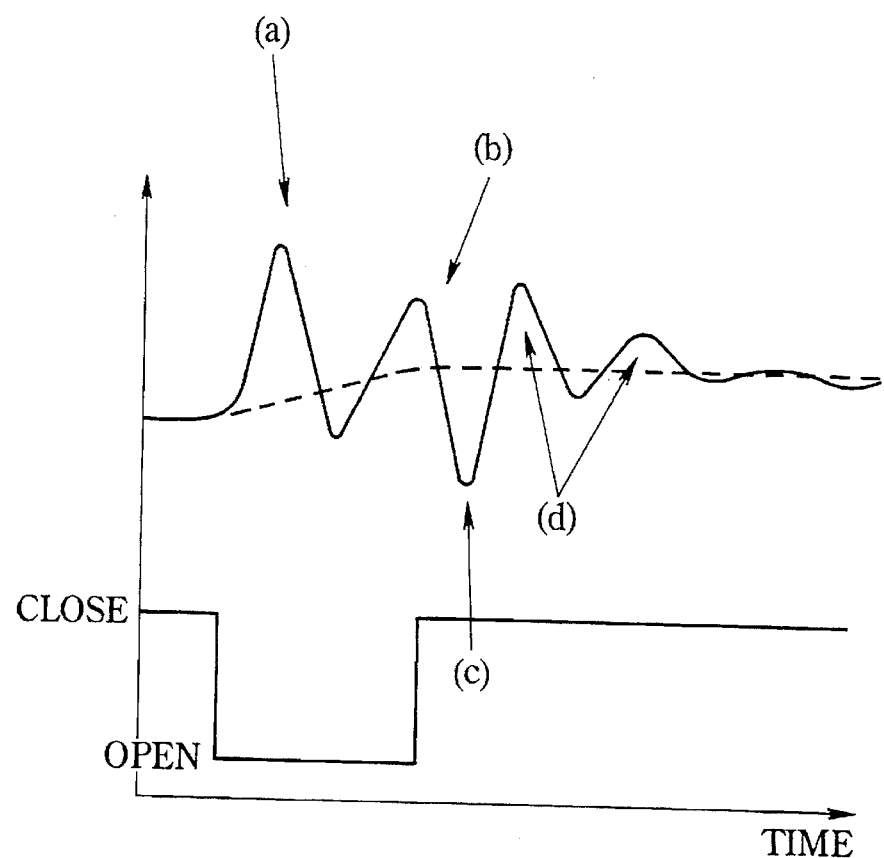
FIGS. 4A and 4B are graphs used in explaining wheel cylinder pressure pulsations produced with the use of electric current having a rectangular waveform applied to the solenoid valve.

With the use of a rectangular pulse signal for fluid flow fine control, however, the fluid pulsates in the fluid conduit leading from the outlet port P2 to produce great wheel cylinder pressure fluctuations, causing vibrations to be transmitted to the vehicle body. This will be described in connection with FIGS. 4A and 4B. When the electrical pulse signal applied to the electrical winding G changes from its high level to its low level to open the solenoid valve, as shown in FIG. 4B, a great increase appears in the wheel cylinder pressure, as indicated by the character (a) of FIG. 4A. Thereafter, the wheel cylinder pressure decreases and then increases, as indicated by the character (b) of FIG. 4A, in spite of the fact that the plunger D is held away from the orifice B. This is stemmed from the influence of the orifice B having its sectional area regulated by the electromagnetic forces between the armature E and the electrical winding G. When the electrical pulse signal applied to the electrical winding G changes from its low level to its high level to close the solenoid valve, as shown in FIG. 4B, a great decrease appears in the wheel cylinder pressure, as indicated by the character (c) of FIG. 4A. Thereafter, the wheel cylinder pressure fluctuates, as indicated by the character (d) of FIG. 4A. This is stemmed from the resonance of the fluid conduit leading from the outlet port P2. In FIG. 4A, the broken curve indicates the variations of the wheel cylinder pressure without such fluctuations. This invention is intended to keep the wheel cylinder pressure free from fluctuations by providing appropriate gradients for the leading and trailing edges of the pulses of the control signals applied to the actuators.

The second solenoid valve 9 is substantially the same in structure with the first solenoid valve 8 except that the bias spring F is seated between the plunger D and the housing A to bias the plunger D toward its closed position. When the electric winding G is energized by the presence of electrical current within it, the plunger D moves toward the fully-open position.

The actuator 6i operates, on control signals EVi, AVi and MRi fed thereto from the control unit in one of two modes. These control signals are taken in the form of electric currents having their duty ratios adjusted under pulse width modulation (PWM) control. The first mode is referred to as a pressure increasing mode where the first solenoid valve 8 is repetitively changed at predetermined intervals of time between the first and second positions to adjust the gradient at which the corresponding wheel cylinder pressure increases. The second mode is referred to as a pressure decreasing mode where the second solenoid valve 9 is repetitively changed at predetermined intervals of time between the first and second positions to adjust the gradient at which the corresponding wheel cylinder pressure decreases. It is to be noted that the suffix "i" is used throughout the invention to represent components or factors used for each of the front-left road wheel 1FL, the front-left road wheel 1FR and the rear road wheels 1R. For example, the actuators 6FL, 6FR and 6R may be represented by an actuator 6i. The duty ratios $D_{AVi}$ and $D_{EVi}$ of the control signals applied to the electrical windings G of the first and second solenoid valves 8 and 9 are repetitively determined from calculations performed by the control unit 20, these calculations being made based upon various conditions of the automotive vehicle that are sensed during its operation. These sensed conditions include road wheel speeds $V_{WFL}$, $V_{WFR}$ and $V_{WR}$, master cylinder pressures $P_{MCF}$ and $P_{MCR}$, brake application BS, longitudinal acceleration Xg, and wheel cylinder pressures $P_{FL}$, $P_{FR}$ and $P_R$. Thus, road wheel speed sensors 3FL, 3FR and 3R, master cylinder pressure sensors 13F and 13R, a brake switch 14, a longitudinal acceleration sensor 16, and wheel cylinder pressure sensors 18FL, 18FR and 18R are connected to the control unit 20.

The front-left road wheel speed sensor 3FL is associated with the front-left road wheel 1FL and it produces a series of electrical pulses of a repetition rate directly proportional to the speed $V_{WFL}$ of rotation of the front-left road wheel 1FL. This pulse signal is fed from the front-left road wheel speed sensor 3FL to a road wheel speed calculation circuit 15FL which uses the tire rotation radius of the front-left road wheel 1FL to calculate the front-left road wheel speed $V_{WFL}$ in the form of the peripheral speed of the front-left road wheel 1FL. The front-right road wheel speed sensor 3FR is associated with the front-right road wheel 1FR and it produces a series of electrical pulses of a repetition rate directly proportional to the speed $V_{WFR}$ of rotation of the front-left road wheel 1FR. This pulse signal is fed from the front-left road wheel speed sensor 3FR to a road wheel speed calculation circuit 15FR which uses the tire rotation radius of the front-right road wheel 1FR to calculate the front-right road wheel speed $V_{WFR}$ in the form of the peripheral speed of the front-right road wheel 1FR. The rear road wheel speed sensor 3R is associated with the propeller shaft PS and it produces a series of electrical pulses of a repetition rate directly proportional to the speed of rotation of the propeller shaft PS, that is, to the average speed of rotation of the rear road wheels 3RL and 3RR. This pulse signal is fed from the rear road wheel speed sensor 3R to a road wheel speed calculation circuit 15R which uses the tire rotation radii of the rear road wheels 1RL and 1RR to calculate the rear road wheel speed $V_R$ in the form of the peripheral speed of the rear road wheels. The master cylinder pressure sensors 13F and 13R are shown as positioned in the first and second fluid conduits to sense the fluid pressures $P_{MCF}$ and $P_{MCR}$ therein. The first conduit leads from the master cylinder 5 to the actuators 6FL and 6FR and the second conduit leads from the master cylinder 5 to the actuator 6R. The master cylinder pressure sensors 13F and 13R produce electrical signals indicative of the sensed pressures $P_{MCF}$ and $P_{MCR}$ of the fluid discharged to the first and second fluid conduits from the master cylinder 5. The brake switch 14 is associated with the brake pedal 4 to close to supply current from the engine battery to the control unit 20 in response to the application of foot braking BS to the vehicle (when the brake pedal 4 is depressed). The longitudinal acceleration sensor 16 is mounted on the vehicle body to sense the longitudinal acceleration of the vehicle body and it produces an electric signal indicative of the sensed longitudinal acceleration Xg. The wheel cylinder pressure sensors 18FL and 18FR are positioned to sense the fluid pressures $P_{FL}$ and $P_{FR}$ introduced into the respective wheel cylinders 2FL and 2FR and they produce electric signals indicative of the sensed wheel cylinder pressures $P_{FL}$ and $P_{FR}$. The wheel cylinder pressure sensor 18R is positioned to sense the fluid pressure $P_R$ introduced into the wheel cylinders 2RL and 2RR and it produces an electric signal indicative of the sensed wheel cylinder pressure $P_R$.

The control unit 20 employs a digital computer which includes an input interface circuit 20a, a central processing unit (CPU) 20b, a memory (MEM) 20c and an output interface circuit 20d. The central processing unit 20b communicates with the rest of the computer via data bus 20e. The input interface circuit 20a includes an analog-to-digital converter which receives analog signals from the various sensors and converts them into digital form for application to the central processing unit 20b. The A to D conversion process is initiated on command from the central processing unit 20b which selects the input channel to be converted. The memory 20c contains programs for operating the central processing unit 20b and further contains appropriate data used in calculating appropriate values for the duty ratios of the control signals applied to the actuators 6FL, 6FR and 6R. Control words specifying desired duty ratios are periodically transferred by the central processing unit 20b to the output interface circuit 20d which converts the received control words into corresponding drive signals for operation of PWM drive circuits 22ai, 22bi and 22ci to produce control signals EVi, AVi and MRi to the actuator 6i. For this purpose, the central processing unit 20b estimates the vehicle speed (pseudo vehicle speed) V based on the road wheel speeds $V_{WFL}$, $V_{WFR}$ and $V_{WR}$. The central processing unit 20b may be arranged to set the pseudo vehicle speed V at a maximum one of the sensed road wheel speeds $V_{WFL}$, $V_{WFR}$ and $V_R$. The central processing unit 20b calculates a target road wheel speed $V_W^*$ based on the pseudo vehicle speed V and calculates road wheel accelerations (decelerations) $V'_{WF1}$, $V'_{WFR}$ and $V'_{WR}$ by differentiating the respective road wheel speed $V_{WFL}$, $V_{WFR}$ and $V_{WR}$. The central processing unit 20b calculates target wheel cylinder pressures $P_{FL}^*$, $P_{FR}^*$ and $P_R^*$ based on the road wheel speeds $V_{WFL}$, $V_{WFR}$ and $V_{WR}$, the road wheel accelerations (decelerations) $V'_{WF1}$, $V'_{WFR}$ and $V'_{WR}$ and the target road wheel speed $V_W^*$. The central processing unit 20b calculates the control words used in producing the control signals $EV_{FL}$, $EV_{FR}$ and $EV_R$, $AV_{FL}$, $AV_{FR}$ and AVR, and $MR_{FL}$, $MR_{FR}$ and $MR_R$ applied to the respective actuators $6_{FL}$, $6_{FR}$ and $6_R$ in a manner to bring the sensed wheel cylinder pressures $P_{FL}$, $P_{FR}$ and $P_R$ in agreement with the respective target wheel cylinder pressure $P_{FL}^*$, $P_{FR}^*$ and $P_R^*$.

Figure 5:
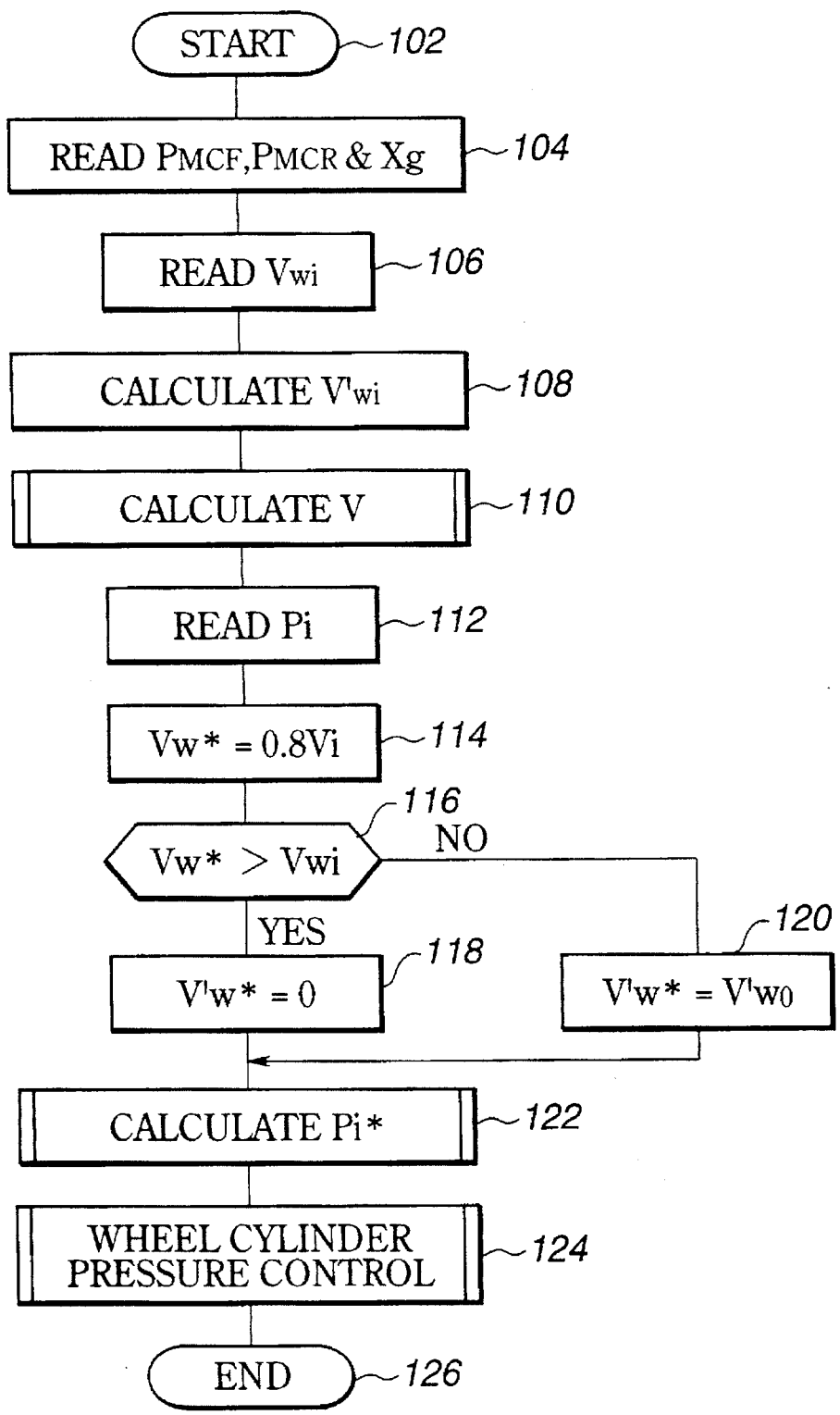
FIG. 5 is a flow diagram showing the programming of the digital computer as it is used for braking force control.

FIG. 5 is a flow diagram illustrating the programming of the digital computer as it is used for the wheel cylinder pressure control. The computer program is entered at the point 102 at uniform intervals of time $\Delta T$, for example, 10 msec. At the point 104 in the program, the sensed master cylinder pressures $P_{MCF}$ and $P_{MCR}$ and the sensed longitudinal acceleration Xg are read into the computer memory 20c. At the point 106, the sensed road wheel speed $V_{wi}$ (i=FL, FR, R) is read into the computer memory 20c. At the point 108, the central processing unit 20b calculates the road wheel acceleration (deceleration) $V'_{wi}$ by differentiating the read road wheel speed $V_{wi}$. At the point 110 in the program, the central processing unit 20b calculates the pseudo vehicle speed V based on the read road wheel speeds $V_{WFL}$, $V_{WFR}$ and $V_R$. This calculation may be made as described in Japanese Patent Kokai No. 4-27650. At the point 112, the sensed wheel cylinder pressures $P_{FL}$, $P_{FR}$ and $P_R$ are read into the computer memory 20c. At the point 114, a target road wheel speed $V_W^*$ is calculated as $V_W^*$=0.8 V. The calculated value for the target road wheel speed $V_i^*$ is used to update its old value stored in the computer memory 20c.

At the point 116 in the program, a determination is made as to whether or not the road wheel speed $V_{wi}$ is less than the target road wheel speed $V_w^*$. If the answer to this question is "YES", then the program proceeds to the point 118. Otherwise, the program proceeds to the point 120. At the point 118, the target road wheel acceleration (deceleration) $V'_w^*$ is set at 0. This value is used to update its old value stored in the computer memory 20c. Following this, the program proceeds to the point 122. At the point 120, the target road wheel acceleration (deceleration) $V'_w^*$ is calculated as $V'_w^* = V'_{w0}$ where $V'_{w0}$ is a predetermined negative value. Following this, the program proceeds to the point 122.

At the point 122 in the program, the target wheel cylinder pressures $P^*_{FL}$, $P^*_{FR}$ and $P^*_R$ are calculated for the respective wheel cylinders 2FL, 2FR, 2RL and 2RR. At the point 124, the target values for the control signals EV, AV and MR are calculated based on the differences of the estimated wheel cylinder pressures ($P_{FL}$, $P_{FR}$, $P_R$) from the target wheel cylinder pressures ($P^*_{FL}$, $P^*_{FR}$, $P_R$). The calculated target values are transferred through the data bus 20e to the output interface circuit 20d which operates the drive circuits 22a to produce control signals EV, AV and MR to the respective actuators 6FL, 6FR and 6R. Following this, the program proceeds to the end point 126.

Figure 6:
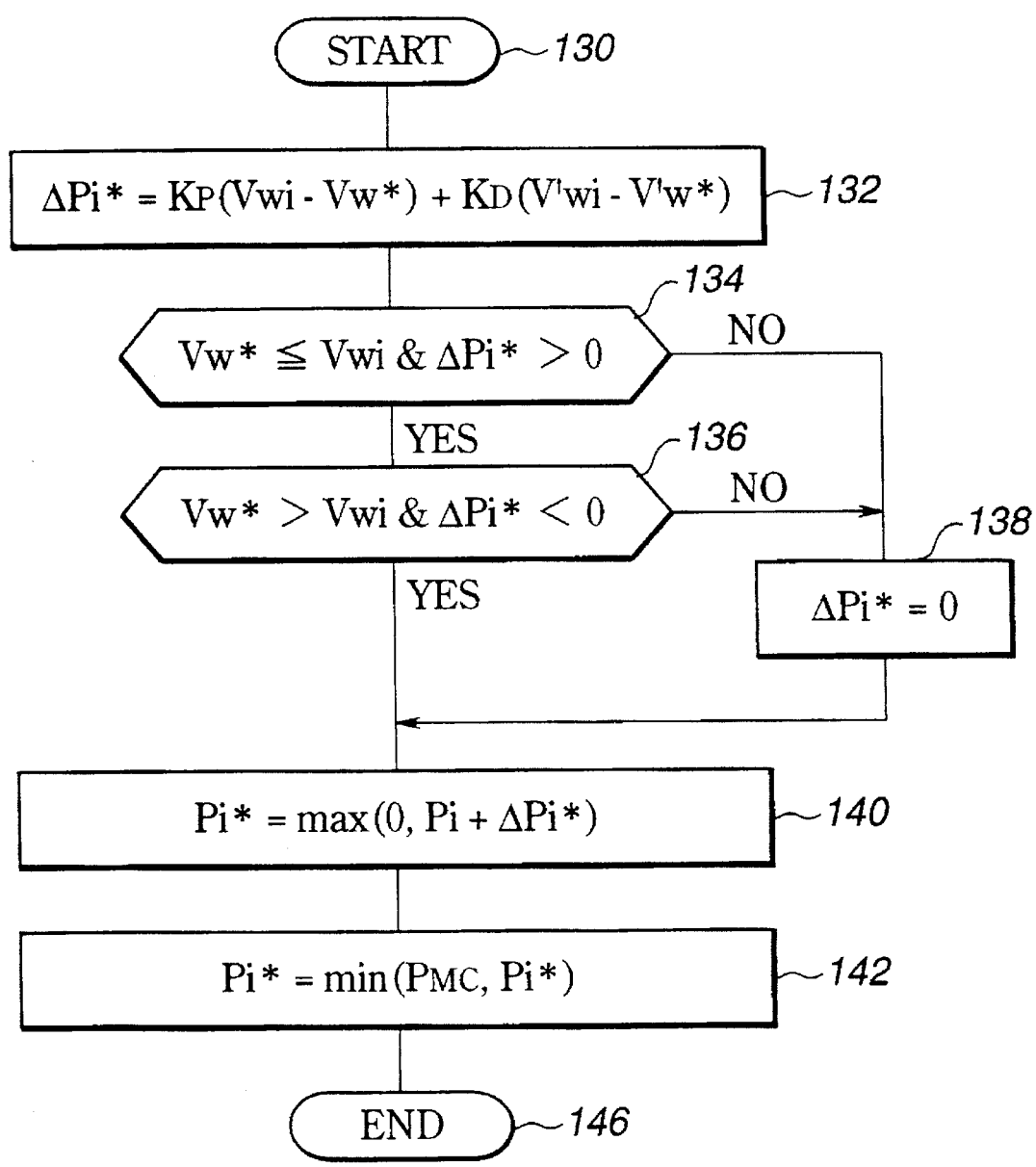
FIG. 6 is a detailed flow diagram showing the programming of the digital computer as it is used to calculate a target wheel cylinder pressure.

FIG. 6 is a flow diagram illustrating the above calculation of the target wheel cylinder pressure $P_i^*$. At the point 130 in FIG. 6, which corresponds to the point 122 of FIG. 5, the computer program is entered. At the point 132, the target wheel cylinder pressure change $\Delta Pi^*$ is calculated as $\Delta Pi^* = K_P(VW_i - V_w^*) + K_D(V'W_i - V'W^*)$. The term "$K_P(V_{Ei} - V_w^*)$" is a proportional term where $K_P$ is a proportional gain. The term "$K_D(V'_{Wi} - V'_w^*)$" is an integral term where $K_D$ is an integral gain. At the point 134 in the program, a determination is made as to whether or not the road wheel speeds $V_{wi}$ is equal to or greater than the target road wheel speed $V_w^*$ and the calculated target wheel cylinder pressure change $\Delta Pi^*$ is greater than zero. If the answer to this question is "YES", then the program proceeds to the point 136. Otherwise, the program proceeds to the point 138. At the point 136 in the program, a determination is made as to whether or not the road wheel speeds $V_{wi}$ is less than the target road wheel speed $V_w^*$ and the calculated target wheel cylinder pressure change $\Delta Pi^*$ is less than zero. If the answer to this question is "YES", then the program proceeds to the point 140. Otherwise, the program proceeds to the point 138 where the target wheel cylinder pressure change $\Delta Pi^*$ is set at zero. At the point 140 in the program, the target wheel cylinder pressure $Pi^*$ is selected as $Pi^* = \max(0, Pi + \Delta Pi^*)$. At the point 142, the target wheel cylinder pressure $Pi^*$ is set as $Pi^* = \min(P_{MC}, Pi^*)$. Following this, the program proceeds to the end point 146 which corresponds to the point 124 of FIG. 5.

Figure 7:
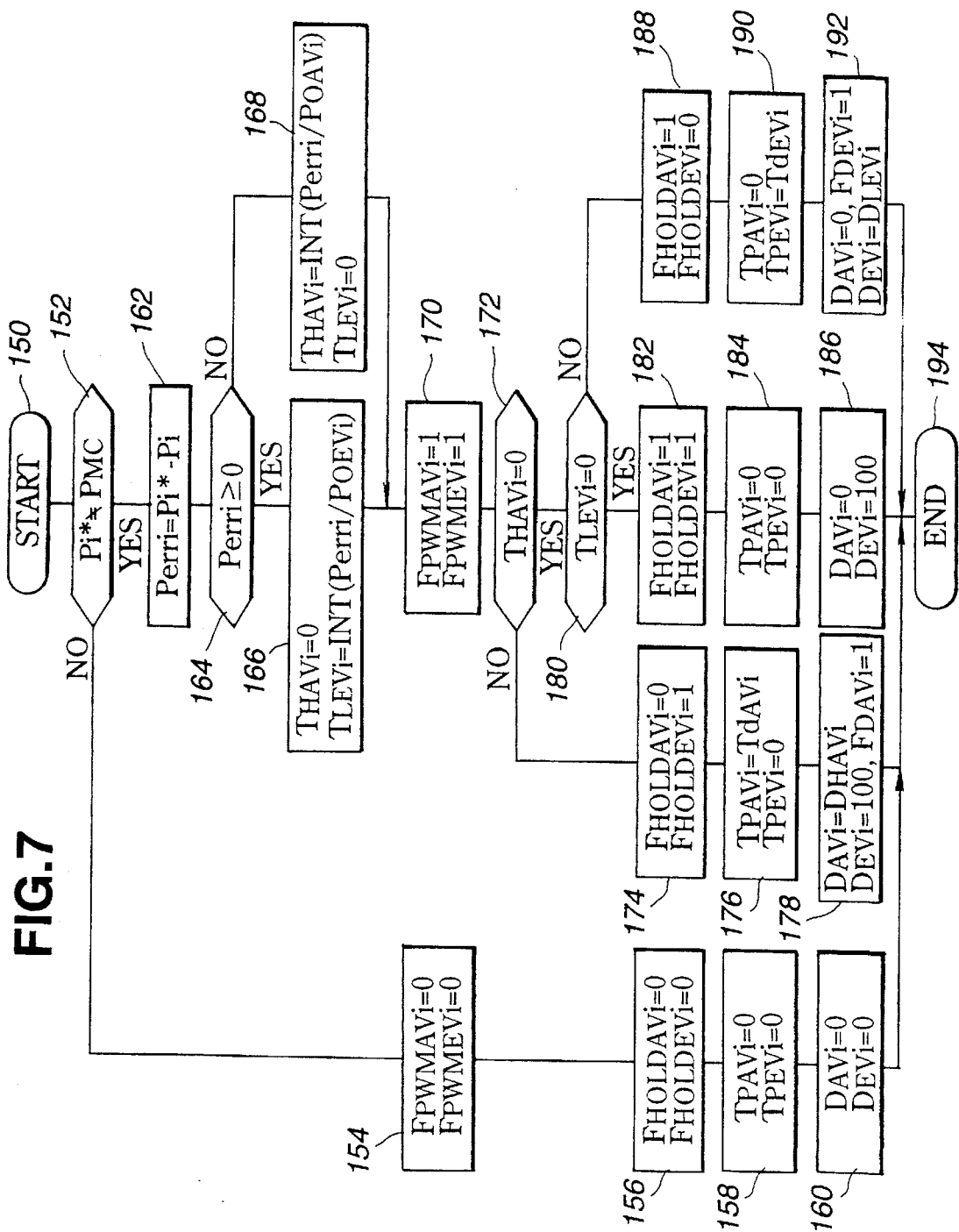
FIG. 7 is a detailed flow diagram showing the programming of the digital computer as it is used for wheel cylinder pressure control.

FIG. 7 is a flow diagram illustrating the above calculation of the target wheel cylinder pressure change. At the point 150 in FIG. 7, which corresponds to the point 124 of FIG. 5, the computer program is entered. At the point 152, a determination is made as to whether or not the target wheel cylinder pressure $Pi^*$ is not equal to the master cylinder pressure $P_{MC}$. If the answer to this question is "YES", then the program proceeds to the point 162. Otherwise, the program proceeds to the point 154 where the second solenoid valve PWM control permission flag $F_{PWMAVi}$ is cleared to zero and the first solenoid valve PWM control permission flag $F_{PWMEVi}$ is cleared to zero. At the point 156 in the program, the second solenoid valve pressure holding control flag $F_{HOLDAVi}$ is cleared to zero and the first solenoid valve pressure holding control flag $F_{HOLDEVi}$ is cleared to zero. At the point 158, the pressure decreasing cycle timer $T_{PAVi}$ is cleared to zero and the pressure increasing cycle timer $T_{PEVi}$ is cleared to zero. At the point 160, the second solenoid valve duty ratio $D_{AVi}$ is set at 0% and the first solenoid valve duty ratio $D_{EVi}$ is set at 0%. Following this, the program proceeds to the end point 194 which corresponds to the point 126 of FIG. 5.

At the point 162 in the program, a deviation $P_{erri}$ of the wheel cylinder pressure Pi from the target wheel cylinder pressure Pi * is calculated. At the point 164, a determination is made as to whether or not the calculated deviation $P_{erri}$ is equal to or greater than zero. If the answer to this question is "YES", then the program proceeds to the point 166 where the pressure decreasing period $T_{HAVi}$ is set at zero and the pressure increasing period $T_{LEVi}$ is calculated as $T_{LEVi} = INT(P_{erri}/P_{EVOi})$ where character $P_{EVOi}$ designates a reference wheel cylinder pressure increase value by which the wheel cylinder pressure Pi increases when the PWM control continues for the first solenoid valve 8 for the period $\Delta T$ with the duty ratio $D_{EVi}$ set at 0%. The function INT( ) means as counting factions of 5 and over as a unit and disregard the rest. Otherwise, the program proceeds to the point 168 where the pressure decreasing period $T_{HAVi}$ is calculated as $T_{HAVi} = INT(P_{erri}/P_{AVOi})$ and the pressure increasing period $T_{LEVi}$ is set at zero. The character $P_{AVOi}$ designates a reference wheel cylinder pressure decrease value by which the wheel cylinder pressure Pi decreases when the PWM control continues for the second solenoid valve 9 for the period $\Delta T$ with the duty ratio $D_{AVi}$ set at 100%. At the point 170, the second solenoid valve PWM control permission flag $F_{PWMAVi}$ is set at 1 and the first solenoid valve PWM control permission flag $F_{PWMEVi}$ is set at 1.

At the point 172 in the program, a determination is made as to whether or not the pressure decreasing period $T_{HAVi}$ is equal to zero. If the answer to this question is "YES", then the program proceeds to the point 180. Otherwise, the program proceeds to the point 174 where the second solenoid valve pressure holding control flag $F_{HOLDAVi}$ is cleared to zero and the first solenoid valve pressure holding control flag $F_{HOLDEVi}$ is set at 1. At the point 176, the pressure decreasing cycle timer $T_{PAVi}$ is set at a predetermined count value $T_{dAVi}$ and the pressure increasing cycle timer $T_{PEVi}$ is cleared to zero. At the point 178, the second solenoid valve duty ratio $D_{AVi}$ is set at a predetermined closed side value $D_{LAVi}$ and the first solenoid valve duty ratio $D_{EVi}$ is set at 100%. The predetermined closed side value $D_{LAVi}$ will be described later. Following this, the program proceeds to the end point 194.

At the point 180 in the program, a determination is made as to whether or not the pressure increasing period $T_{LEVi}$ is equal to zero. If the answer to this question is "YES", then the program proceeds to the point 182 where the second solenoid valve pressure holding control flag $F_{HOLDAVi}$ is set at 1 and the first solenoid valve pressure holding control flag $F_{HOLDEVi}$ is set at 1. At the point 184, the pressure decreasing cycle timer $T_{PAVi}$ is cleared to zero and the pressure increasing cycle timer $T_{PEVi}$ is cleared to zero. At the point 186, the second solenoid valve duty ratio $D_{AVi}$ is set at 0% and the first solenoid valve duty ratio $D_{EVi}$ is set at 100%. Following this, the program proceeds to the end point 194. If the answer inputted at the point 180 is "NO", then the program proceeds to the point 188 where the second solenoid valve pressure holding control flag $F_{HOLDAVi}$ is set at 1 and the first solenoid valve pressure holding control flag $F_{HOLDEVi}$ is cleared to zero. At the point 190, the pressure decreasing cycle timer $T_{PAVi}$ is cleared to zero and the pressure increasing cycle timer $T_{PEVi}$ is set at a predetermined count value $T_{dEVi}$. At the point 192, the second solenoid valve duty ratio $D_{AVi}$ is set at 0% and the first solenoid valve duty ratio $D_{EVi}$ is set at a predetermined closed side value $D_{HEVi}$. The predetermined closed side value $D_{HEVi}$ will be described later. Following this, the program proceeds to the end point 194.

Figure 8A:
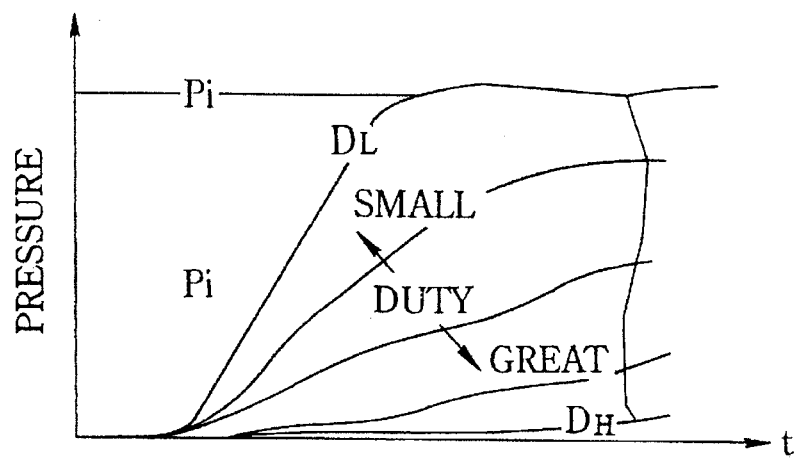
FIGS. 8A and 8B are graphs used in explaining the duty ratio set for the electric current supplied to the solenoid valve.
Figure 8B:
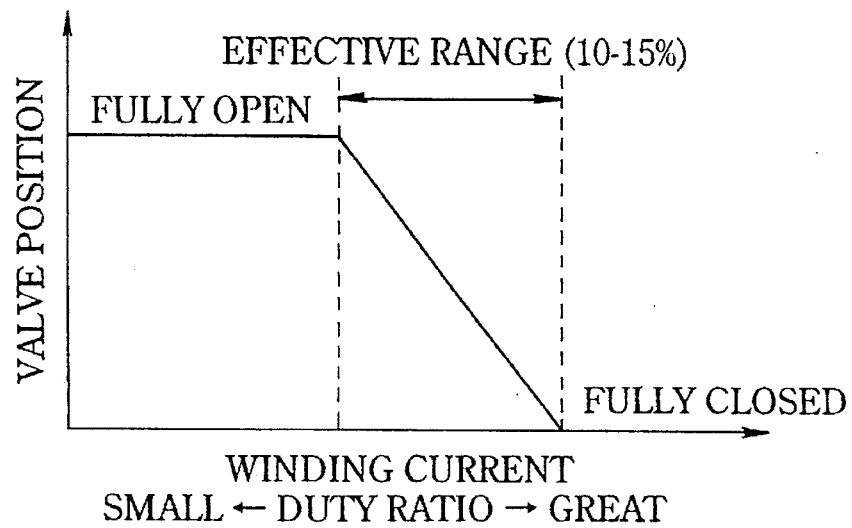

The first solenoid valve 8 is in its open position in the absence of electric current supplied thereto and in its closed position in the presence of the electric current. The fluid flow through the first solenoid valve 8 is controlled by varying the duty ratio of the electric current supplied to the first solenoid valve 8. Although the duty ratio is controllable between 0% and 100%, however, the first solenoid valve opens at a predetermined duty ratio $D_L$ greater than 0% and it is closed at a predetermined duty ratio $D_H$ less than 100%, as shown in FIG. 8A. The effective duty ratio range extending from the duty ratio $D_L$ to the duty ratio $D_H$ is about 10 to 15% of the controllable duty ratio range extending from 0% to 100%, as shown in FIG. 8B. In this invention, the duty ratio $D_L$ is used as the first solenoid valve open side duty ratio $D_{LEVi}$ and the duty ratio $D_H$ is used ass the first solenoid valve closed side duty ratio $D_{HEVi}$. The second solenoid valve 9 is in its closed position in the absence of electric current supplied thereto and in its open position in the presence of the electric current. The fluid flow through the second solenoid valve 9 is controlled by varying the duty ratio of the electric current supplied to the second solenoid valve 9. Although the duty ratio is controllable between 0% and 100%, however, the second solenoid valve 9 is closed at a predetermined duty ratio $D_L$ greater than 0% and it opens at a predetermined duty ratio $D_H$ less than 100%. The effective duty ratio range extending from the duty ratio $D_L$ to the duty ratio $D_H$ is about 10 to 15% of the controllable duty ratio range extending from 0% to 100%. In this invention, the duty ratio $D_L$ is used as the second solenoid valve closed side duty ratio $D_{LAVi}$ and the duty ratio $D_H$ is used ass the second solenoid valve open side duty ratio $D_{HAVi}$.

Figure 9A:
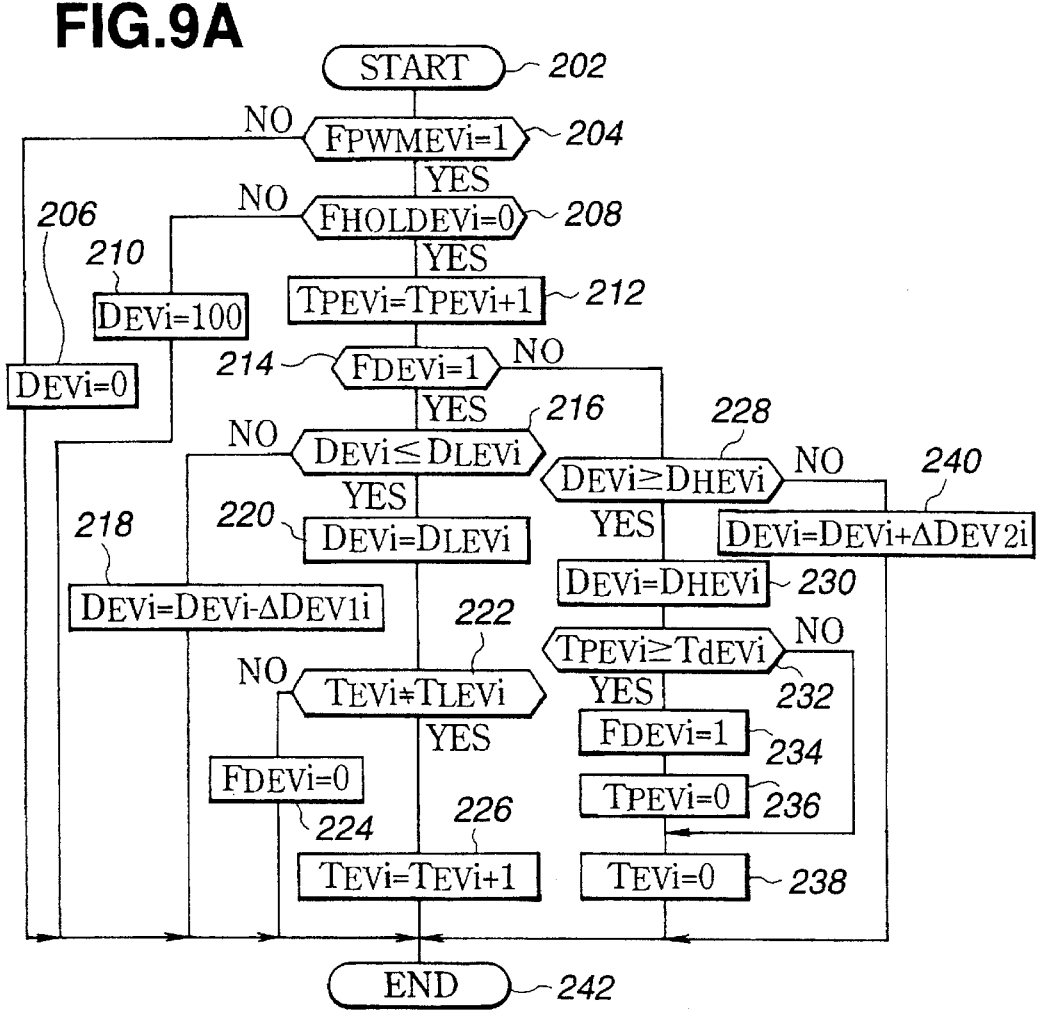
FIG. 9A is a flow diagram showing the programming of the digital computer as it is used to set the duty ratio of the electric current EV supplied to the first solenoid valve of the actuator.

FIG. 9A is a flow diagram illustrating the programming of the digital computer as it is used to set the duty ratio $D_{EVi}$ of the control signal EVi applied to the first solenoid valve 8. At the point 202, the computer program is entered at uniform intervals of time $\Delta T_{EVi}$, for example, 1 msec, much shorter than the interval of time $\Delta T$ of execution of the program of FIG. 5. At the point 204, a determination is made as to whether or not the first solenoid valve PWM control permission flag $F_{PWMEVi}$ is set at 1. If the answer to this question is "YES", then the program proceeds to the point 208. Otherwise, the program proceeds to the point 206 where the first solenoid valve duty ratio $D_{EVi}$ is set at 0% in order to hold the first solenoid valve 8 in its open position. This first solenoid valve duty ratio $D_{EVi}$ is stored in the computer memory 20c. Following this, the program proceeds to the end point 242.

At the point 208 in the program, a determination is made as to whether or not the first solenoid valve pressure holding control flag $F_{HOLDEVi}$ is cleared to 0. If the answer to this question is "YES", then the program proceeds to the point 212. Otherwise, the program proceeds to the point 210 where the first solenoid valve duty ratio $D_{EVi}$ is set at 100% in order to hold the first solenoid valve 8 in its closed position. This first solenoid valve duty ratio $D_{EVi}$ is stored in the computer memory 20c. Following this, the program proceeds to the end point 242.

At the point 212 in the program, the pressure increasing cycle timer $T_{PEVi}$ is incremented by one step. At the point 214, a determination is made as to whether or not a first solenoid valve duty ratio decrease permission flag $F_{DEVi}$ is set at 1. If the answer to this question is "YES", then the program proceeds to another determination step at the point 216. This determination is as to whether or not the first solenoid duty ratio $D_{EVi}$ is equal to or less than the predetermined first solenoid valve open side duty ratio $D_{LEVi}$. If the answer to this question is "YES", then the program proceeds to the point 220. Otherwise, the program proceeds to the point 218 where the first solenoid valve duty ratio $D_{EVi}$ is calculated by subtracting a predetermined first positive change value $\Delta D_{EV1i}$ from the last value of the first solenoid valve duty ratio $D_{EVi}$. The calculated first solenoid valve duty ratio $D_{EVi}$ is used to update the last value stored in the computer memory 20c. Following this, the program proceeds to the end point 242.

At the point 220 in the program, the first solenoid valve duty ratio $D_{EVi}$ is set at the first solenoid valve open side duty ratio $D_{LEVi}$. This duty ratio $D_{EVi}$ is stored in the computer memory 20c. Following this, the program proceeds to a determination step at the point 222. This determination is as to whether or not a pressure increase timer count $T_{EVi}$ is not equal to the pressure increasing period $T_{LEVi}$. If the answer to this question is "NO", then it means that this timer has counted up for the pressure increasing period $T_{LEVi}$ and the program proceeds to the point 224 where the first solenoid valve duty ratio decrease permission flag $F_{DEVi}$ is cleared to zero and then to the end point 242. Otherwise, the program proceeds to the point 226 where the pressure increase timer $T_{EVi}$ is incremented by one step and then to the end point 242.

If the answer to the question inputted at the point 214 is "NO", then the program proceeds to another determination step at the point 228. This determination is as to whether or not the first solenoid valve duty ratio $D_{EVi}$ is equal to or greater than the predetermined closed side duty ratio $D_{HEVi}$. If the answer to this question is "YES", then the program proceeds to the point 230 where the first solenoid valve duty ratio $D_{EVi}$ is set at the predetermined closed side duty ratio $D_{HEVi}$. This duty ratio $D_{EVi}$ is stored in the computer memory 20c. Following this, the program proceeds to a determination step at the point 232. This determination is as to whether or not the pressure increasing cycle timer count $T_{PEVi}$ is equal to or greater than a predetermined pressure increase value $T_{dEVi}$. If the answer to this question is "YES", then the program proceeds to the point 234 where the first solenoid valve duty ratio decrease permission flag $F_{DEVi}$ is set at 1, and then to the point 236 where the pressure increasing cycle timer $T_{PEVi}$ is cleared to 0, and then to the point 238. Otherwise, the program proceeds directly to the point 238 where the pressure increase timer $T_{EVi}$ is cleared to 0. Following this, the program proceeds to the end point 242.

If the answer to the question inputted at the point 228 is "NO", then the program proceeds to the point 240 where the first solenoid valve duty ratio $D_{EVi}$ is calculated by adding a second predetermined duty ratio decrease value $\Delta D_{EV2i}$ smaller than the first predetermined duty ratio decrease value $\Delta D_{EV1i}$ to the last value of the duty ratio $D_{EVi}$. The calculated duty ratio $D_{EVi}$ is stored in the computer memory 20c. Following this, the program proceeds to the end point 242.

Figure 10A:
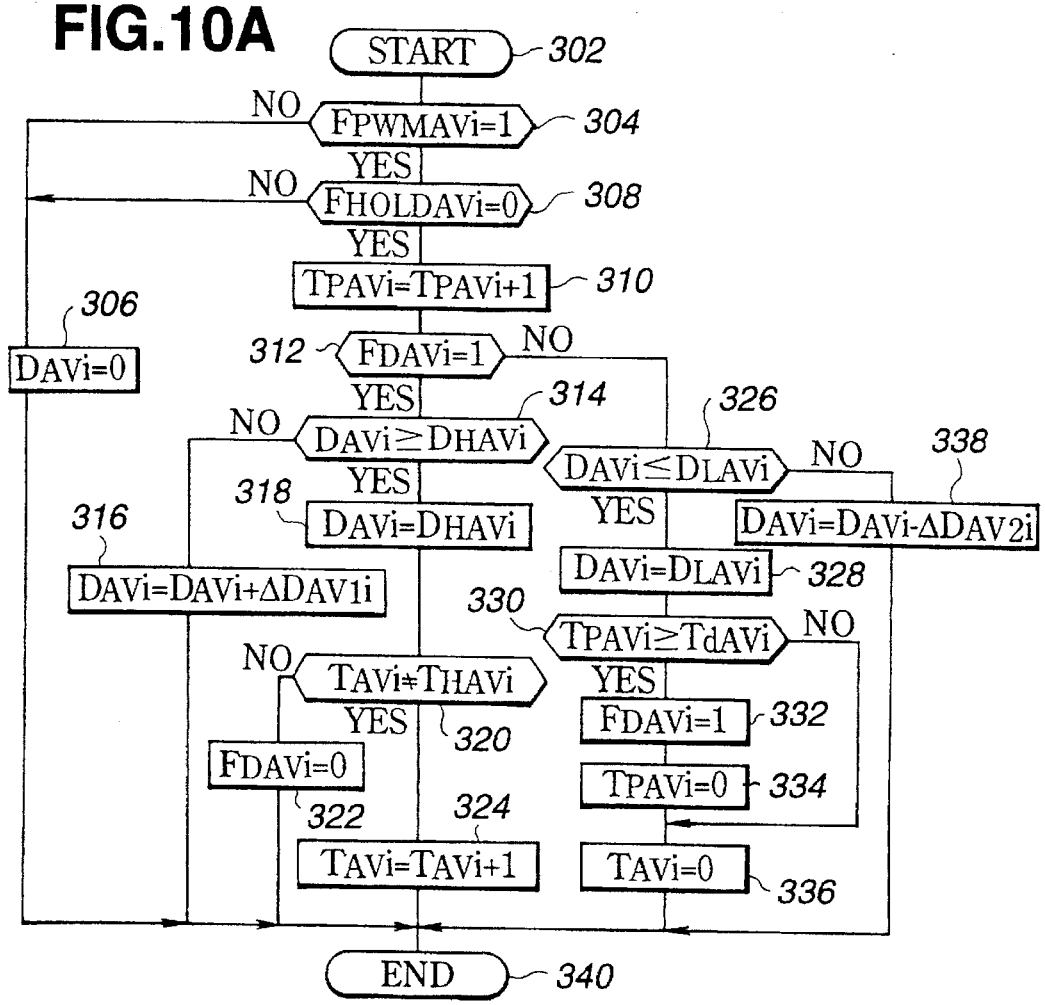
FIG. 10A is a flow diagram showing the programming of the digital computer as it is used to set the duty ratio of the electric current AV supplied to the second solenoid valve of the actuator.

FIG. 10A is a flow diagram illustrating the programming of the digital computer as it is used to set the duty ratio $D_{AVi}$ of the control signal AVi applied to the second solenoid valve 9. At the point 302, the computer program is entered at uniform intervals of time $\Delta T_{AVi}$, for example, 1 msec, much shorter than the interval of time $\Delta T$ of execution of the program of FIG. 5. At the point 304, a determination is made as to whether or not the second solenoid valve PWM control permission flag $F_{PWMAVi}$ is set at 1. if the answer to this question is "YES", then the program proceeds to the point 308. Otherwise, the program proceeds to the point 306 where the second solenoid valve duty ratio $D_{AVi}$ is set at 0% in order to hold the second solenoid valve 9 in its closed position. This second solenoid valve duty ratio $D_{AVi}$ is stored in the computer memory 20c. Following this, the program proceeds to the end point 340.

At the point 308 in the program, a determination is made as to whether or not the second solenoid valve pressure holding control flag $F_{HOLDAVi}$ is cleared to 0. If the answer to this question is "YES", then the program proceeds to the point 310. Otherwise, the program proceeds to the point 306. At the point 310 in the program, the pressure decreasing cycle timer $T_{PAVi}$ is incremented by one step. At the point 312, a determination is made as to whether or not a second solenoid valve duty ratio increase permission flag $F_{DAVi}$ is set at 1. If the answer to this question is "YES", then the program proceeds to another determination step at the point 314. This determination is as to whether or not the second solenoid duty ratio $D_{AVi}$ is equal to or less than the predetermined second solenoid valve open side duty ratio $D_{HAVi}$. If the answer to this question is "YES", then the program proceeds to the point 318. Otherwise, the program proceeds to the point 316 where the second solenoid valve duty ratio $D_{AVi}$ is calculated by adding a predetermined first positive change value $\Delta D_{AV1i}$ to the last value of the second solenoid valve duty ratio $D_{AVi}$. The calculated second solenoid valve duty ratio $D_{AVi}$ is used to update the last value stored in the computer memory 20c. Following this, the program proceeds to the end point 340.

At the point 318 in the program, the second solenoid valve duty ratio $D_{AVi}$ is set at the second solenoid valve open side duty ratio $D_{HAVi}$. This duty ratio $D_{AVi}$ is stored in the computer memory 20c. Following this, the program proceeds to a determination step at the point 320. This determination is as to whether or not a pressure decrease timer count $T_{AVi}$ is not equal to the pressure decreasing period $T_{HAVi}$. If the answer to this question is "NO", then it means that this timer has counted up for the pressure decreasing period $T_{HAVi}$ and the program proceeds to the point 322 where the second solenoid valve duty ratio increase permission flag $F_{DAVi}$ is cleared to zero and then to the end point 340. Otherwise, the program proceeds to the point 324 where the pressure decrease timer $T_{AVi}$ is incremented by one step and then to the end point 340.

If the answer to the question inputted at the point 312 is "NO", then the program proceeds to another determination step at the point 326. This determination is as to whether or not the second solenoid valve duty ratio $D_{AVi}$ is equal to or less than the predetermined closed side duty ratio $D_{LAVi}$. If the answer to this question is "YES", then the program proceeds to the point 328 where the second solenoid valve duty ratio $D_{AVi}$ is set at the predetermined closed side duty ratio $D_{LAVi}$. This duty ratio $D_{AVi}$ is stored in the computer memory 20c. Following this, the program proceeds to a determination step at the point 330. This determination is as to whether or not the pressure decreasing cycle timer count $T_{PAVi}$ is equal to or greater than a predetermined pressure decrease value $T_{dEVi}$. If the answer to this question is "YES", then the program proceeds to the point 332 where the second solenoid valve duty ratio increase permission flag $F_{DAVi}$ is set at 1, and then to the point 334 where the pressure decreasing cycle timer $T_{PAVi}$ is cleared to 0, and then to the point 336. Otherwise, the program proceeds directly to the point 336 where the pressure decrease timer $T_{AVi}$ is cleared to 0. Following this, the program proceeds to the end point 340.

If the answer to the question inputted at the point 326 is "NO", then the program proceeds to the point 338. At the point 338, the second solenoid valve duty ratio $D_{AVi}$ is calculated by subtracting a second predetermined positive duty ratio decrease value $\Delta D_{AV2i}$ smaller than the first predetermined duty ratio decrease value $\Delta D_{AV1i}$ to the last value of the duty ratio $D_{AVi}$. The calculated duty ratio $D_{AVi}$ is stored in the computer memory 20c. Following this, the program proceeds to the end point 340.

Referring to FIGS. 11A to 11D, the operation of the antiskid control apparatus will be described. It is now assumed that, before and at the time t0, the vehicle runs on a smooth road surface having a sufficient high friction coefficient at a constant high speed in the absence of vehicle braking. At the time t1, the brake pedal 4 is depressed to initiate the application of braking to the vehicle. After the time t1, the pseudo vehicle speed V calculated at the point 110 of FIG. 5 decreases and thus the target vehicle speed $V_w^*$, which is calculated as $V_w^*=1.8 \times V$ at the point 114 of FIG. 5, decreases, as indicated by the broken line of FIG. 11A. Since no antiskid control is performed before the time t2, the wheel cylinder pressure Pi is equal to the master cylinder $P_{MC}$, as shown in FIG. 11D. Therefore, the target wheel cylinder change $\Delta Pi^*$ calculated at the point 132 of FIG. 6 still remains positive, as shown in FIG. 11C, although the road wheel acceleration (deceleration) $V'_{wi}$ decreases in the negative range, as shown in FIG. 11B. With the wheel cylinder pressure Pi increased, the calculated target wheel cylinder pressure Pi* becomes greater than the master cylinder pressure $P_{MC}$. In this case, however, the target wheel cylinder pressure Pi* is set at the value equal to the master cylinder pressure $P_{MC}$ at the point 142 of FIG. 6.

Since the target wheel cylinder pressure Pi* and the master cylinder pressure $P_{MC}$ are identical, the control is transferred through the point 152 of FIG. 7 to the point 154 of FIG. 7 where both of the first and second solenoid valve PWM control permission flags $F_{PWMEVi}$ and $F_{PWMAVi}$ are cleared to 0 to inhibit the PWM control for both of the first and second solenoid valves 8 and 9. Following this, both of the first and second solenoid valve pressure holding control flags $F_{HOLDEVi}$, $F_{HOLDAVi}$ are cleared to zero at the point 156 of FIG. 7, both of the pressure decreasing and increasing cycle timers $T_{PEVi}$ and $T_{PAVi}$ are cleared to 0 at the point 158 of FIG. 7, and both of the first and second solenoid valve duty ratios $D_{EVi}$ and $D_{AVi}$ are set at 0 at the point 160 of FIG. 7. As a result, the actuator 6i is instructed to operate in a normal braking force control mode with no antiskid control for the first and second solenoid valves 8 and 9. Since the first solenoid valve PWM control permission flag $F_{PWMEVi}$ is set at 0, the control is transferred through the point 204 of FIG. 9A to the point 206 of FIG. 9A where the first solenoid valve duty ratio $D_{EVi}$ is set at 0% to place the first solenoid valve 8 in its open position. Similarly, the second solenoid valve duty ratio $D_{AVi}$ is set at 0%, at the point 306 of FIG. 10A, to place the second solenoid valve 9 in its closed position.

During the normal braking force control mode, the wheel cylinder pressure Pi increases with increasing master cylinder pressure $P_{MC}$, as shown in FIG. 11D and the road wheel speed $V_{wi}$ decreases, as shown in FIG. 11A. As the pseudo vehicle speed V decreases, the target road wheel speed $V_w^*$ decreases and the road wheel acceleration (deceleration) $V'_{vi}$ decreases in the negative range, as shown in FIG. 11B. Therefor, the target wheel cylinder pressure change $\Delta Pi^*$ calculated at the point 132 of FIG. 6 decreases and it reaches zero at the time t3, as shown in FIG. 11C. Although the master cylinder pressure $P_{MC}$ increases, the target wheel cylinder pressure Pi* remains at its value calculated at the time t3 by the step at the point 142 of FIG. 6.

After the time t3, the master cylinder pressure $P_{MC}$ deviates away from the target wheel cylinder pressure Pi*, as shown in FIG. 11D. Since the deviation $P_{erri}$ calculated at the point 162 of FIG. 7 is 0 at or just after the time t3, however, the control is transferred through the point 164 of FIG. 7 to the point 166 of FIG. 7 where both of the pressure increasing and decreasing periods $T_{LEVi}$ and $T_{HAVi}$ are set at 0. At the point 170 of FIG. 7, both of the first and second solenoid valve PWM control permission flags $F_{PWMEVi}$ and $F_{PWMAVi}$ are set at 1. Following this, the control is transferred through the points 172 and 180 of FIG. 7 to the point 182 of FIG. 7 where both of the first and second solenoid valve pressure holding control flags $F_{HOLDEVi}$ and $F_{HOLDAVi}$ are set at 1. Upon completion of the pressure holding control flag setting operation, both of the pressure decreasing and increasing cycle timers $T_{PAVi}$ and $T_{PEVi}$ are cleared to 0 at the point 184 of FIG. 7. Then, the first solenoid valve duty ratio $D_{EVi}$ is set at 100% and the second solenoid valve duty ratio $D_{AVi}$ is set at 0% at the point 186 of FIG. 7. As a result, the actuator 6i is instructed to operate in a pressure holding mode to interrupt the communication between the master cylinder 5 and the wheel cylinder 2i.

Since the first solenoid valve PWM control permission flag $F_{PWMEVi}$ is set at 1 and the first solenoid valve pressure holding control flag $F_{HOIDEVi}$ is set at 1, the control is transferred through the points 204 and 208 of FIG. 9A to the point 210 of FIG. 9A where the first solenoid valve duty ratio $D_{EVi}$ is at 100% to place the first solenoid valve 8 in its closed position. Since the second solenoid valve PWM control permission flag $F_{PWMAVi}$ is set at 1 and the second solenoid valve pressure holding control flag $F_{HOLDAVi}$ is set at 1, the control is transferred through the points 304 and 308 of FIG. 10A to the point 306 of FIG. 10A where the second solenoid valve duty ratio $D_{AVi}$ is set at 0% to retain the second solenoid valve 9 in its closed position. As a result, the actuator 6i holds the wheel cylinder pressure Pi, as shown in FIG. 11D.

During the pressure holding mode, the target wheel cylinder pressure change ΔPi* calculated at the point 132 of FIG. 6 decreases in the negative range, as shown in FIG. 11C. Since the target road wheel speed $V_W^*$ remains less than the road wheel speed $V_{wi}$, however, it is limited to 0 at the point 138 of FIG. 6. Thus, the target wheel cylinder pressure Pi* is set at the value equal to the existing wheel cylinder pressure Pi at the point 140 of FIG. 6. At the point 142 of FIG. 6, the target wheel cylinder pressure Pi* set at the point 140 of FIG. 6 is used to update its last value stored in the computer memory 20c since the master cylinder pressure $P_{MC}$ remains increasing. As a result, the pressure holding mode continues.

The road wheel speed $V_{wi}$ decreases and it reaches the target road wheel speed $V_W^*$ at the time t4, as shown in FIG. 11A. After the time t4, thus, the control is transferred through the point 116 of FIG. 5 to the point 118 of FIG. 5 where the target road wheel acceleration (deceleration) $V'_W^*$ is set at 0. As a result, the target wheel cylinder pressure change ΔPi* calculated at the point 132 of FIG. 6 further decreases in the negative range, as shown in FIG. 11C, so that the target road wheel speed $V_W^*$ exceeds the road wheel speed $V_{wi}$. At the points 140 and 142 of FIG. 6, thus, the target wheel cylinder pressure Pi* is set at the value equal to a value equal to the sum of the wheel cylinder pressure Pi and the target wheel cylinder pressure change ΔPi*. Since the target wheel cylinder pressure change ΔPi* has a negative value, the target wheel cylinder pressure Pi* decreases and the wheel cylinder pressure deviation $P_{erri}$ calculated at the point 162 of FIG. 7 becomes negative. For this reason, the control is transferred through the point 164 of FIG. 7 to the point 168 of FIG. 7 where the pressure decreasing period $T_{HAVi}$ is calculated as $T_{HAVi}=INT(P_{erri}/P_{AVOi})$ and the pressure increasing period $T_{LEVi}$ is set at 0. At the point 170 of FIG. 7, both of the PWM control permission flags $F_{PWMAVi}$ and $F_{PWMEVi}$ are set at 1 again. Following this, the control is transferred through the points 170 and 172 of FIG. 7 to the point 174 of FIG. 7 where the second solenoid valve pressure holding control flag $F_{HOLDAVi}$ is cleared 0 and the first solenoid valve pressure holding control flag $F_{HOLDEVi}$ is set at 1. Upon completion of the pressure holding control flag setting operation, the pressure decreasing cycle timer $T_{PAVi}$ is set at the predetermined value $T_{dAVi}$ and the pressure increasing cycle timer $T_{PEVi}$ is cleared to 0 at the point 176 of FIG. 7. Then, the first solenoid valve duty ratio $D_{EVi}$ is set at 100% and the second solenoid valve duty ratio $D_{AVi}$ is set at the predetermined closed side value $D_{LAVi}$ at the point 178 of FIG. 7. As a result, the actuator 6i is instructed to operate in a pressure decreasing mode. During this pressure decreasing mode, the control signal MRi is applied from the drive circuit 22ci to operate the electric motor 10 to discharge fluid pressure from the wheel cylinder 2i to the reservoir 12.

Figure 10B:
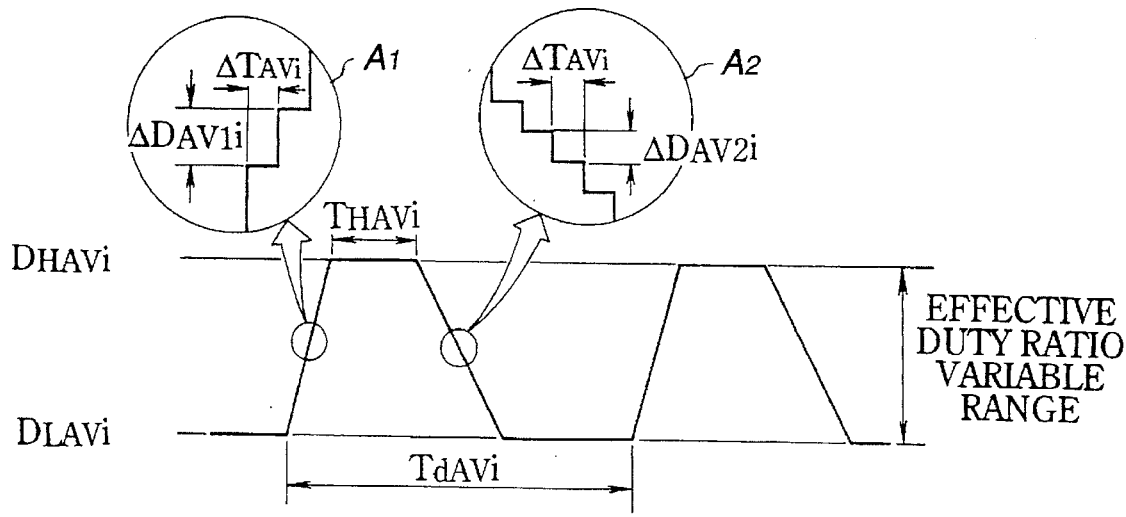
FIG. 10B is a graph used in explaining the second solenoid valve duty ratio changes made during the wheel cylinder pressure decreasing mode.

Since the first solenoid valve PWM control permission flag $F_{PWMEVi}$ is set at 1 and the first solenoid valve pressure holding control flag $F_{HOIDEVi}$ is set at 1, the control is transferred through the points 204 and 208 of FIG. 9A to the point 210 of FIG. 9A where the first solenoid valve duty ratio $D_{EVi}$ is at 100% to place the first solenoid valve 8 in its closed position. Since the second solenoid valve PWM control permission flag $F_{PWMAVi}$ is set at 1, whereas the second solenoid valve pressure holding control flag $F_{HOIDAVi}$ is set at 0, the control is transferred through the points 304 and 308 of FIG. 10A to the point 310 of FIG. 10A where the pressure decreasing mode starts with its opening degree increasing phase. That is, the second solenoid valve duty ratio $D_{AVi}$ increases by $\Delta D_{AV1i}$ (see the point 316 of FIG. 10A) from the predetermined closed side value $D_{LAVi}$ (set at the point 178 of FIG. 7) toward the predetermined open side value $D_{HAVi}$ for each cycle $\Delta T_{AVi}$ of execution of the program of FIG. 10A, as shown in the enlarged view enclosed by the circle A1 of FIG. 10B. When the second solenoid valve duty ratio $D_{AVi}$ reaches the predetermined open side duty ratio $D_{HAVi}$, the control is transferred through the point 314 of FIG. 10A to the point 318 of FIG. 10A where the second solenoid valve duty ratio $D_{AVi}$ is maintained at the predetermined open side duty ratio $D_{HAVi}$. This condition is referred to as a first opening degree retaining phase and it continues until the pressure decrease timer $T_{AVi}$ is timed out, that is, for the pressure decreasing period $T_{HAVi}$. Thus, the second solenoid valve duty ratio $D_{AVi}$ remains at the open side duty ratio $D_{HAVi}$ for the period of time $T_{HAVi}$, as shown in FIG. 10B, so that the second solenoid valve 9 is held substantially in its open position to cause a wheel cylinder pressure decrease corresponding to the pressure decreasing period $T_{HAVi}$. When the pressure decrease timer $T_{AVi}$ is timed out for the pressure decreasing period $T_{HAVi}$, the second solenoid valve duty ratio increase permission flag $F_{DAVi}$ is cleared to 0 at the point 322 of FIG. 10A and, thus, the control is transferred through the points 312 and 326 of FIG. 10A to the point 338 of FIG. 10A. That is, the second solenoid valve duty ratio $D_{AVi}$ is decreased by the second predetermined value $\Delta D_{AV2i}$ for each cycle of execution of the program of FIG. 10A, as shown in the enlarged view enclosed in the circle A2 of FIG. 10B. As a result, the second solenoid valve 9 moves toward its closed position. Since the second predetermined value $\Delta D_{AV2i}$ is less than the first predetermined value $\Delta D_{AV1i}$, the gradient or the rate at which the second solenoid valve 9 closes is more gentle than that at which the second solenoid valve opens. This condition is referred to as an opening degree decreasing phase and it continues until the second solenoid valve duty ratio $D_{AVi}$ reaches the closed side duty ratio $D_{LAVi}$. When the second solenoid valve duty ratio $D_{AVi}$ reaches the closed side duty ratio $D_{LAVi}$, the control is transferred through the point 326 of FIG. 10A to the point 328 of FIG. 10A where the second solenoid valve duty ratio $D_{AVi}$ is maintained at the predetermined closed side duty ratio $D_{LAVi}$. This condition is referred to as a second opening degree retaining phase and it continues until the pressure decreasing cycle timer $T_{PAVi}$ is timed out for the pressure decreasing period $T_{dAVi}$. Thus, the second solenoid valve duty ratio $D_{AVi}$ remains at the closed side duty ratio $D_{LAVi}$ and the second solenoid valve 9 remains substantially in its closed position to hold the wheel cylinder pressure Pi. This cycle, which includes the opening degree increasing phase, the first opening degree retaining phase, the opening degree decreasing phase and the second opening degree retaining phase, is repeated at intervals of time $T_{dAVi}$, as shown in FIG. 10B, to decrease the wheel cylinder pressure Pi, as shown in FIG. 11D. As a result, the road wheel speed $V_{wi}$ increases toward the sensed road wheel speed, as shown in FIG. 11A.

When the target wheel cylinder pressure change $\Delta Pi^*$ calculated at the point 132 of FIG. 6 reaches zero at the time t5, as shown in FIG. 11C, the target wheel cylinder pressure $Pi^*$ and the wheel cylinder pressure Pi are identical and the deviation $P_{erri}$ is calculated at 0 at the point 162 of FIG. 7. Thus, the control is transferred through the point 164 of FIG. 7 to the point 166 of FIG. 7 where both of the pressure increasing and decreasing periods $T_{LEVi}$ and $T_{HAVi}$ are set at 0. At the point 170 of FIG. 7, both of the first and second solenoid valve PWM control permission flags $F_{PWMEVi}$ and $F_{PWMAVi}$ are set at 1. Following this, the control is transferred through the points 172 and 180 to the point 182 of FIG. 7 where both of the first and second solenoid valve pressure holding control flags $F_{HOLDEVi}$ and $F_{HOLDAVi}$ are set at 1. Upon completion of the pressure holding control flag setting operation, both of the pressure decreasing and increasing cycle timers $T_{PAVi}$ and $T_{PEVi}$ are cleared to 0 at the point 184 of FIG. 7. Then, the first solenoid valve duty ratio $D_{EVi}$ is set at 100% and the second solenoid valve duty ratio $D_{AVi}$ is set at 0% at the point 186 of FIG. 7. As a result, the actuator 6i is instructed to operate in the pressure holding mode to interrupt the communication between the master cylinder 5 and the wheel cylinder 2i.

Since the first solenoid valve PWM control permission flag $F_{PWMEVi}$ is set at 1 and the first solenoid valve pressure holding control flag $F_{HOIDEVi}$ is set at 1, the control is transferred through the points 204 and 208 of FIG. 9A to the point 210 of FIG. 9A where the first solenoid valve duty ratio $D_{EVi}$ is at 100% to place the first solenoid valve 8 in its closed position. Since the second solenoid valve PWM control permission flag $F_{PWMEVi}$ is set at 1 and the second solenoid valve pressure holding control flag $F_{HOIDAVi}$ is set at 1, the control is transferred through the points 304 and 308 of FIG. 10A to the point 306 of FIG. 10A where the second solenoid valve duty ratio $D_{AVi}$ is set at 0% to retain the second solenoid valve 9 in its closed position. As a result, the actuator 6i holds the wheel cylinder pressure Pi, as shown in FIG. 11D.

During the pressure holding mode, the target wheel cylinder pressure change $\Delta Pi^*$ calculated at the point 132 of FIG. 6 increases in the positive range, as shown in FIG. 11C. Since the target road wheel speed $V_w^*$ remains greater than the road wheel speed $V_{wi}$, however, it is limited to 0 at the point 138 of FIG. 6. Thus, the target wheel cylinder pressure $Pi^*$ is set at the value equal to the last value thereof so that the pressure holding mode continues.

The road wheel speed $V_{wi}$ increases and it reaches the target road wheel speed $V_w^*$ at the time t6, as shown in FIG. 11A. After the time t6, thus, the control is transferred through the point 116 of FIG. 5 to the point 120 of FIG. 5 where the target road wheel acceleration (deceleration) $V'_w{}^*$ is set at the predetermined negative value $V'_{wo}$. Therefore, the target wheel cylinder pressure change $\Delta Pi^*$ calculated at the point 132 of FIG. 6 decreases, as shown in FIG. 11C. For this reason, the control is transferred through the points 134 and 136 of FIG. 6 to the points 140 and 142 of FIG. 6 where the target wheel cylinder pressure $Pi^*$ is set at a value greater than the wheel cylinder presure Pi. Since the target wheel cylinder pressure change $\Delta Pi^*$ has a great positive value, the wheel cylinder pressure deviation $P_{erri}$ calculated at the point 162 of FIG. 7 is positive. For this reason, the control is transferred through the point 164 of FIG. 7 to the point 166 of FIG. 7 where the pressure decreasing period $T_{HAVi}$ is set at 0 and the pressure increasing period $T_{LEVi}$ is calculated as $T_{LEVi}$=INT($P_{erri}/P_{EVoi}$). At the point 170 of FIG. 7, both of the PWM control permission flags $F_{PWMAVi}$ and $F_{PWMEVi}$ are set at 1. Following this, the control is transferred through the points 172 and 180 of FIG. 7 to the point 188 of FIG. 7 where the second solenoid valve pressure holding control flag $F_{HOLDAVi}$ is set at 1 and the first solenoid valve pressure holding control flag $F_{HOLDEVi}$ is cleared to 0. Upon completion of the pressure holding control flag setting operation, the pressure decreasing cycle timer $T_{PAVi}$ is set at 0 and the pressure increasing cycle timer $T_{PEVi}$ is set at the predetermined value $T_{dEVi}$ at the point 190 of FIG. 7. Then, the first solenoid valve duty ratio $D_{EVi}$ is set at the predetermined closed side value $D_{HEVi}$ and the second solenoid valve duty ratio $D_{AVi}$ is set at 0 at the point 178 of FIG. 7. As a result, the actuator 6i is instructed to operate in a pressure increasing mode.

Figure 9B:
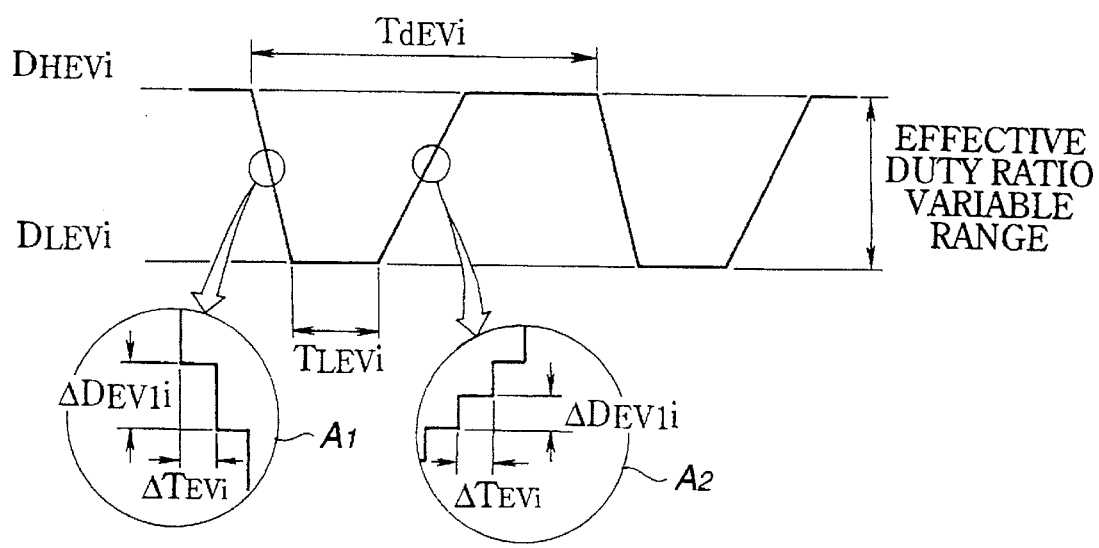
FIG. 9B is a graph used in explaining the first solenoid valve duty ratio changes made during the wheel cylinder pressure increasing mode.

Since the second solenoid valve PWM control permission flag $F_{PWMAVi}$ is set at 1 and the second solenoid valve pressure holding control flag $F_{HOIDAVi}$ is set at 1, the control is transferred through the points 304 and 308 of FIG. 10A to the point 306 of FIG. 10A where the second solenoid valve duty ratio $D_{AVi}$ is at 0% to place the second solenoid valve 9 in its closed position. Since the first solenoid valve PWM control permission flag $F_{PWMEVi}$ is set at 1, whereas the first solenoid valve pressure holding control flag $F_{HOIDEVi}$ is set at 0, the control is transferred through the points 204 and 208 of FIG. 9A to the point 212 of FIG. 9A where the pressure increasing mode starts with its opening degree increasing phase. That is, the first solenoid valve duty ratio $D_{EVi}$ decreases by $\Delta D_{EV1i}$ (see the point 218 of FIG. 9A) from the predetermined closed side value $D_{HEVi}$ (set at the point 192 of FIG. 7) toward the predetermined open side value $D_{LEVi}$ for each cycle $\Delta T_{EVi}$ of execution of the program of FIG. 9A, as shown in the enlarged view enclosed by the circle A1 of FIG. 9B. When the first solenoid valve duty ratio $D_{EVi}$ reaches the predetermined open side duty ratio $D_{LEVi}$, the control is transferred through the point 216 of FIG. 9A to the point 220 of FIG. 9A where the first solenoid valve duty ratio $D_{EVi}$ is maintained at the predetermined open side duty ratio $D_{LEVi}$. This condition is referred to as a first opening degree retaining phase and it continues until the pressure increase timer $T_{EVi}$ is timed out, that is, for the pressure increasing period $T_{LEVi}$. Thus, the first solenoid valve duty ratio $D_{EVi}$ remains at the open side duty ratio $D_{LEVi}$ for the period of time $T_{LEVi}$, as shown in FIG. 9B, so that the first solenoid valve 8 is held substantially in its open position to cause a wheel cylinder pressure increase corresponding to the pressure increasing period $T_{LEVi}$. When the pressure increase timer $T_{EVi}$ is timed out for the pressure increasing period $T_{LEVi}$, the first solenoid valve duty ratio increase permission flag $F_{DEVi}$ is cleared to 0 at the point 224 of FIG. 9A and, thus, the control is transferred through the points 214 and 228 of FIG. 9A to the point 240 of FIG. 9A. That is, the first solenoid valve duty ratio $D_{EVi}$ is increased by the second predetermined value $\Delta D_{EV2i}$ for each cycle of execution of the program of FIG. 9A, as shown in the enlarged view enclosed in the circle A2 of FIG. 9B. As a result, the first solenoid valve 8 moves toward its closed position. Since the second predetermined value $\Delta D_{EV2i}$ is less than the first predetermined value $\Delta D_{EV1i}$, the gradient or the rate at which the first solenoid valve 8 closes is more gentle than that at which the first solenoid valve opens. This condition is referred to as an opening degree decreasing phase and it continues until the first solenoid valve duty ratio $D_{EVi}$ reaches the closed side duty ratio $D_{HEVi}$. When the first solenoid valve duty ratio $D_{EVi}$ reaches the closed side duty ratio $D_{HEVi}$, the control is transferred through the point 228 of FIG. 9A to the point 230 of FIG. 9A where the first solenoid valve duty ratio $D_{EVi}$ is maintained at the predetermined closed side duty ratio $D_{HEVi}$. This condition is referred to as a second opening degree retaining phase and it continues until the pressure increasing cycle timer $T_{PEVi}$ is timed out for the pressure increasing period $T_{dEVi}$. Thus, the first solenoid valve duty ratio $D_{EVi}$ remains at the closed side duty ratio $D_{HEVi}$ and the first solenoid valve 8 remains substantially in its closed position to hold the wheel cylinder pressure pi. This cycle, which includes the opening degree increasing phase, the first opening degree retaining phase, the opening degree decreasing phase and the second opening degree retaining phase, is repeated at intervals of time $T_{dEVi}$, as shown in FIG. 9B, to increase the wheel cylinder pressure Pi, as shown in FIG. 11D. As a result, the road wheel speed $V_{wi}$ decreases, as shown in FIG. 11A.

When the target wheel cylinder pressure change $\Delta Pi^*$ calculated at the point 132 of FIG. 6 reaches zero at the time t9, as shown in FIG. 11C, the target wheel cylinder pressure Pi* and the wheel cylinder pressure Pi are identical and the deviation $P_{erri}$ is calculated at 0 at the point 162 of FIG. 7. Thus, the control is transferred through the point 164 of FIG. 7 to the point 166 of FIG. 7 where both of the pressure increasing and decreasing periods $T_{LEVi}$ and $T_{HAVi}$ are set at 0. At the point 170 of FIG. 7, both of the first and second solenoid valve PWM control permission flags $F_{PWMEVi}$ and $F_{PWMAVi}$ are set at 1. Following this, the control is transferred through the points 172 and 180 of FIG. 7 to the point 182 of FIG. 7 where both of the first and second solenoid valve pressure holding control flags $F_{HOLDEVi}$ and $F_{HOLDAVi}$ are set at 1. Upon completion of the pressure holding control flag setting operation, both of the pressure decreasing and increasing cycle timers $T_{PAVi}$ and $T_{PEVi}$ are cleared to 0 at the point 184 of FIG. 7. Then, the first solenoid valve duty ratio $D_{EVi}$ is set at 100% and the second solenoid valve duty ratio $D_{AVi}$ is set at 0% at the point 186 of FIG. 7. As a result, the actuator 6i is instructed to operate in the pressure holding mode to interrupt the communication between the master cylinder 5 and the wheel cylinder 2i.

Since the first solenoid valve PWM control permission flag $F_{PWMEVi}$ is set at 1 and the first solenoid valve pressure holding control flag $F_{HOLDEVi}$ is set at 1, the control is transferred through the points 204 and 208 of FIG. 9A to the point 210 of FIG. 9A where the first solenoid valve duty ratio $D_{EVi}$ is at 100% to place the first solenoid valve 8 in its closed position. Since the second solenoid valve PWM control permission flag $F_{PWMAVi}$ is set at 1 and the second solenoid valve pressure holding control flag $F_{HOLDAVi}$ is set at 1, the control is transferred through the points 304 and 308 of FIG. 10A to the point 306 of FIG. 10A where the second solenoid valve duty ratio $D_{AVi}$ is set at 0% to retain the second solenoid valve 9 in its closed position. As a result, the actuator 6i holds the wheel cylinder pressure Pi, as shown in FIG. 11D.

During the pressure holding mode, the target wheel cylinder pressure change $\Delta Pi^*$ calculated at the point 132 of FIG. 6 increases in the positive range, as shown in FIG. 11C. Since the target road wheel speed $V_w^*$ remains greater than the road wheel speed $v_{wi}$, however, it is limited to 0 at the point 138 of FIG. 6. Thus, the target wheel cylinder pressure Pi* is set at the value equal to the last value thereof so that the pressure holding mode continues.

The road wheel speed $v_{wi}$ decreases and it reaches the target road wheel speed $v_w^*$ at the time t10, as shown in FIG. 11A. After the time t10, the actuator 6i operates repetitively in the pressure decreasing, holding, increasing and holdings modes in this order.

FIG. 12A shows variations in the duty ratio $D_{EVi}$ of the control signal Evi applied to the first solenoid valve 8 during the execution of the program of FIG. 9A. FIG. 12B shows variations in the wheel cylinder pressure Pi corresponding to the first solenoid valve duty ratio variations of FIG. 12A. It can be seen from FIG. 12A that almost no pulsation occurs in the wheel cylinder pressure Pi not only when the first solenoid valve 8 opens, but also when the first solenoid valve 8 closes. In general, the wheel cylinder pressure pulsations are greater after the first solenoid valve 8 closes than after the first solenoid valve 8 opens. The invention minimizes the wheel cylinder pressure pulsations which may occur after the first solenoid valve 8 opens by decreasing the gradient, that is, the rate at which the first solenoid valve 8 moves in the opening direction and minimizes the wheel cylinder pressure pulsations which may occur after the first solenoid valve 8 closes by further decreasing the gradient, that is, the rate at which the first solenoid valve 8 moves in the closing direction. It is to be understood that the gradient at which the first solenoid valve 8 closes are smaller than the gradient at which the first solenoid valve 8 opens, as can be seen from FIG. 12A.

Figure 13A:
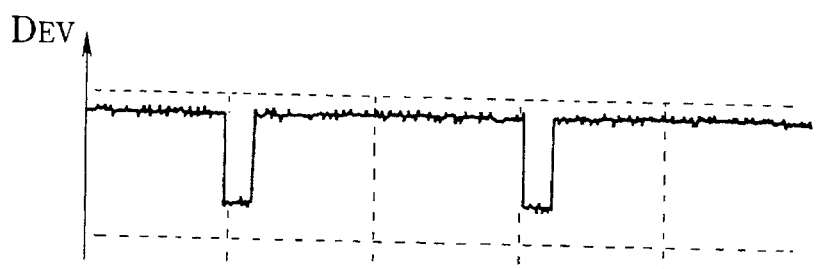
FIG. 13A is a graph showing the variations of the electric current having a rectangular waveform supplied to the first solenoid valve.
Figure 13B:
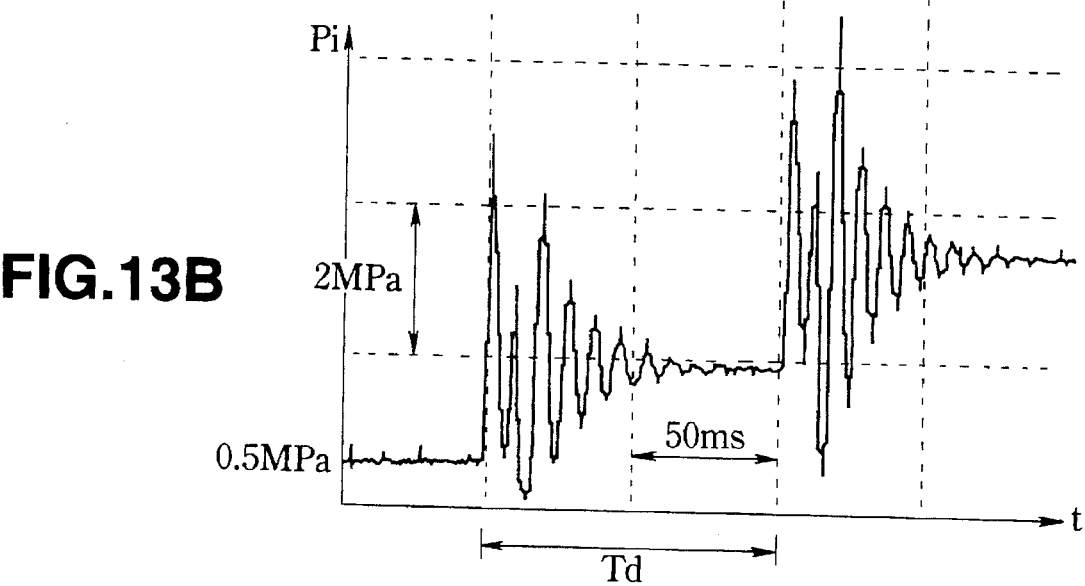
FIG. 13B is a graph showing the wheel cylinder pressure variations made with the electrical current of FIG. 13A.

For comparison of the wheel cylinder pressure pulsation reduction effect obtainable by the invention, tests were conducted. When the first solenoid valve 8 was driven by a drive signal having a rectangular waveform as shown in FIG. 13A, the wheel cylinder pressure Pi varied as shown in FIG. 13B. As can be seen from FIG. 13B, great pulsations occur in the wheel cylinder pressure Pi when the first solenoid valve 8 opens and closes.

It is preferable to set the duty ratio $D_{HEVi}$, $D_{LEVi}$, $D_{LAVi}$ and $D_{HAVi}$ and the duty ratio changes $\Delta D_{AV1i}$, $\Delta D_{AV2i}$, $\Delta D_{EV1i}$ and $\Delta D_{EV2i}$ at values different from one vehicle to another according to the environment in which the actuator 6i operates. The wheel cylinder pressure pulsation reduction effect is greater when the absolute values of the duty ratio changes $\Delta D_{AV1i}$, $\Delta D_{AV2i}$, $\Delta D_{EV1i}$ and $\Delta D_{EV2i}$ are smaller. When these absolute values are too small, it takes much time the solenoid valves move between the open and closed positions. Thus, it is necessary to set the duty ratio changes $\Delta D_{AV1i}$, $\Delta D_{AV2i}$, $\Delta D_{EV1i}$ and $\Delta D_{EV2i}$ according to comparisons between the wheel cylinder pressure control response speed and pulsation reduction effect required for the vehicle. Since the duty ratio changes $\Delta D_{AV2i}$ and $>D_{EV2i}$ have greater effects on the wheel cylinder pressure pulsations than the duty ratio changes $\Delta D_{AV1i}$ and $\Delta D_{EV1i}$, it is preferable to set the former duty ratio changes at smaller values than the latter duty ratio changes to elongate the time it takes the solenoid valve to move from the open position to the closed position as compared to the time it takes the solenoid valve to move from the closed position to the open position. The periods $T_{HAVi}$ and $T_{LEVi}$ are set with regard to the duty ratios $D_{HAVi}$ and $D_{LEVi}$ and the duty ratio changes $\Delta D_{AV1i}$, $\Delta D_{AV2i}$, $\Delta D_{EV1i}$ and $\Delta D_{EV2i}$. It is also preferable to perform the wheel cylinder pressure control with regard to the vehicle speed and road surface friction coefficient.

Figure 14:
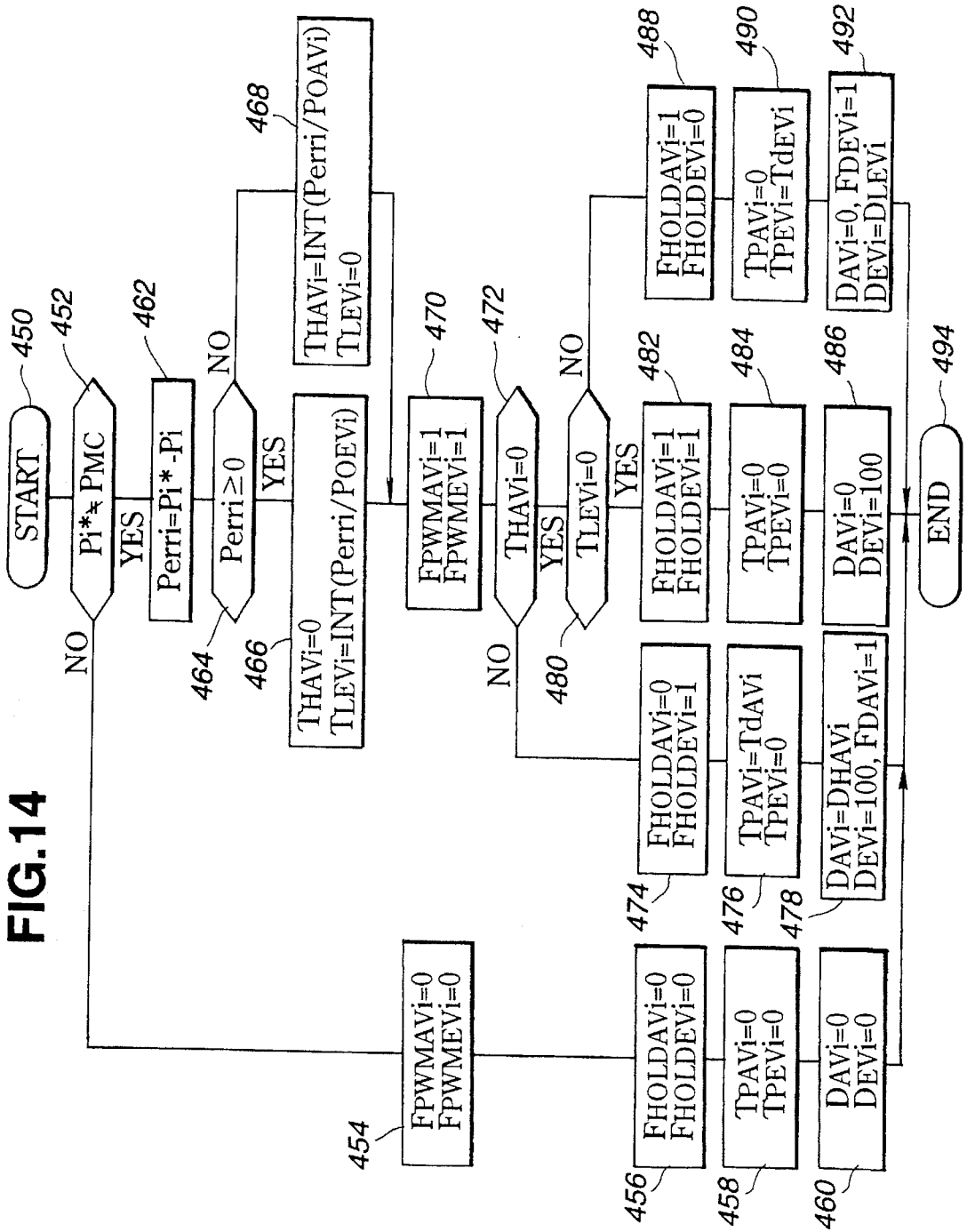
FIG. 14 is a detailed flow diagram showing a modified form of the programing of the digital computer as it is used for wheel cylinder pressure control.

Referring to FIGS. 14 to 16, there is shown a modified form of the wheel cylinder pressure control of the invention. In this modification, the first solenoid valve closed side duty ratio $D_{HEVi}$ and the second solenoid valve open side duty ratio $D_{HAVi}$ are set at a value greater than the upper limit of the effective duty ratio variable range. This is effective to prevent the first and second solenoid valves 8 and 9 from being placed before the fully open position even at the open side duty ratio. The first solenoid valve open side duty ratio $D_{LAVi}$ and the second solenoid valve closed side duty ratio $D_{LAVi}$ are set at a value smaller than the lower limit of the effective duty ratio variable range. This is effective to prevent the first and second solenoid valves 8 and 9 from being placed before the fully closed position even at the closed side duty ratio.

FIG. 14 is a flow diagram illustrating the calculation made at the point 124 of FIG. 5. This program is substantially the same as the program of FIG. 7 except for the steps at the points 478 and 492 of FIG. 14. At the point 450 in FIG. 14, which corresponds to the point 124 of FIG. 5, the computer program is entered. At the point 452, a determination is made as to whether or not the target wheel cylinder pressure Pi* is not equal to the master cylinder pressure $P_{MC}$. If the answer to this question is "YES", then the program proceeds to the point 462. Otherwise, the program proceeds to the point 454 where the second solenoid valve PWM control permission flag $F_{PWMAVi}$ is cleared to zero and the first solenoid valve PWM control permission flag $F_{PWMEVi}$ is cleared to zero. At the point 456 in the program, the second solenoid valve pressure holding control flag $F_{HOLDAVi}$ is cleared to zero and the first solenoid valve pressure holding control flag $F_{HOLDEVi}$ is cleared to zero. At the point 458, the pressure decreasing cycle timer $T_{PAVi}$ is cleared to zero and the pressure increasing cycle timer $T_{PEVi}$ is cleared to zero. At the point 460, the second solenoid valve duty ratio $D_{AVi}$ is set at 0% and the first solenoid valve duty ratio $D_{EVi}$ is set at 0%. Following this, the program proceeds to the end point 494 which corresponds to the point 126 of FIG. 5.

At the point 462 in the program, a deviation $P_{erri}$ of the wheel cylinder pressure Pi from the target wheel cylinder pressure Pi* is calculated. At the point 464, a determination is made as to whether or not the calculated deviation $P_{erri}$ is equal to or grater than zero. If the answer to this question is "YES", then the program proceeds to the point 466 where the pressure decreasing period $T_{HAVi}$ is set at zero and the pressure increasing period $T_{LEVi}$ is calculated as $T_{LEVi}=\mathrm{INT}(P_{erri}/P_{EVOi})$ where character $P_{EVOi}$ designates a reference wheel cylinder pressure increase value by which the wheel cylinder pressure Pi increases when the PWM control continues for the first solenoid valve 8 for the period $\Delta T$ with the duty ratio $D_{EVi}$ set at 0%. The function INT( ) means as counting factions of 5 and over as a unit and disregard the rest. Otherwise, the program proceeds to the point 468 where the pressure decreasing period $T_{HAVi}$ is calculated as $T_{HAVi}=\mathrm{INT}(P_{erri}/P_{AVOi})$ and the pressure increasing period $T_{LEVi}$ is set at zero. The character $P_{AVOi}$ designates a reference wheel cylinder pressure decrease value by which the wheel cylinder pressure Pi decreases when the PWM control continues for the second solenoid valve 9 for the period $\Delta T$ with the duty ratio $D_{AVi}$ set at 100%. At the point 470, the second solenoid valve PWM control permission flag $F_{PWMAVi}$ is set at 1 and the first solenoid valve PWM control permission flag $F_{PWMEVi}$ is set at 1.

At the point 472 in the program, a determination is made as to whether or not the pressure decreasing period $T_{HAVi}$ is equal to zero. If the answer to this question is "YES", then the program proceeds to the point 480. Otherwise, the program proceeds to the point 474 where the second solenoid valve pressure holding control flag $F_{HOLDAVi}$ is cleared to zero and the first solenoid valve pressure holding control flag $F_{HOLDEVi}$ is set at 1. At the point 476, the pressure decreasing cycle timer $T_{PAVi}$ is set at a predetermined count value $T_{dAVi}$ and the pressure increasing cycle timer $T_{PEVi}$ is cleared to zero. At the point 478, the second solenoid valve duty ratio $D_{AVi}$ is set at a predetermined closed side value $D_{HAVi}$, the first solenoid valve duty ratio $D_{EVi}$ is set at 100%, and a second solenoid valve duty ratio increase permission flag $F_{DAVi}$ is set at 1. The predetermined closed side value $D_{LAVi}$ will be described later. Following this, the program proceeds to the end point 494.

At the point 480 in the program, a determination is made as to whether or not the pressure increasing period $T_{LEVi}$ is equal to zero. If the answer to this question is "YES", then the program proceeds to the point 482 where the second solenoid valve pressure holding control flag $F_{HOLDAVi}$ is set at 1 and the first solenoid valve pressure holding control flag $F_{HOLDEVi}$ is set at 1. At the point 484, the pressure decreasing cycle timer $T_{PAVi}$ is cleared to zero and the pressure increasing cycle timer $T_{PEVi}$ is cleared to zero. At the point 486, the second solenoid valve duty ratio $D_{AVi}$ is set at 0% and the first solenoid valve duty ratio $D_{EVi}$ is set at 100%. Following this, the program proceeds to the end point 494. If the answer inputted at the point 480 is "NO", then the program proceeds to the point 488 where the second solenoid valve pressure holding control flag $F_{HOLDAVi}$ is set at 1 and the first solenoid valve pressure holding control flag $F_{HOLDEVi}$ is cleared to zero. At the point 490, the pressure decreasing cycle timer $T_{PAVi}$ is cleared to zero and the pressure increasing cycle timer $T_{PEVi}$ is set at a predetermined count value $T_{dEVi}$. At the point 492, the second solenoid valve duty ratio $D_{AVi}$ is set at 0% and the first solenoid valve duty ratio $D_{EVi}$ is set at a predetermined closed side value $D_{HEVi}$. The predetermined closed side value $D_{HEVi}$ will be described later. Following this, the program proceeds to the end point 494.

The first solenoid valve 8 is in its open position in the absence of electric current supplied thereto and in its closed position in the presence of the electric current. The fluid flow through the first solenoid valve 8 is controlled by varying the duty ratio of the electric current supplied to the first solenoid valve 8. Although the duty ratio is controllable between 0% and 100%, however, the first solenoid valve opens at a predetermined duty ratio $D_L$ greater than 0% and it is closed at a predetermined duty ratio $D_H$ less than 100%, as shown in FIG. 8A. The effective duty ratio range extending from the duty ratio $D_L$ to the duty ratio $D_H$ is about 10 to 15% of the controllable duty ratio range extending from 0% to 100%, as shown in FIG. 8B. In this invention, the duty ratio $D_L$ is used as the first solenoid valve open side duty ratio $D_{LEVi}$ and the duty ratio $D_H$ is used ass the first solenoid valve closed side duty ratio $D_{HEVi}$. The second solenoid valve 9 is in its closed position in the absence of electric current supplied thereto and in its open position in the presence of the electric current. The fluid flow through the second solenoid valve 9 is controlled by varying the duty ratio of the electric current supplied to the second solenoid valve 9. Although the duty ratio is controllable between 0% and 100%, however, the second solenoid valve 9 is closed at a predetermined duty ratio $D_L$ greater than 0% and it opens at a predetermined duty ratio $D_H$ less than 100%. The effective duty ratio range extending from the duty ratio $D_L$ to the duty ratio $D_H$ is about 10 to 15% of the controllable duty ratio range extending from 0% to 100%. In this invention, the duty ratio $D_L$ is used as the second solenoid valve closed side duty ratio $D_{LAVi}$ and the duty ratio $D_H$ is used ass the second solenoid valve open side duty ratio $D_{HAVi}$.

Figure 15A:
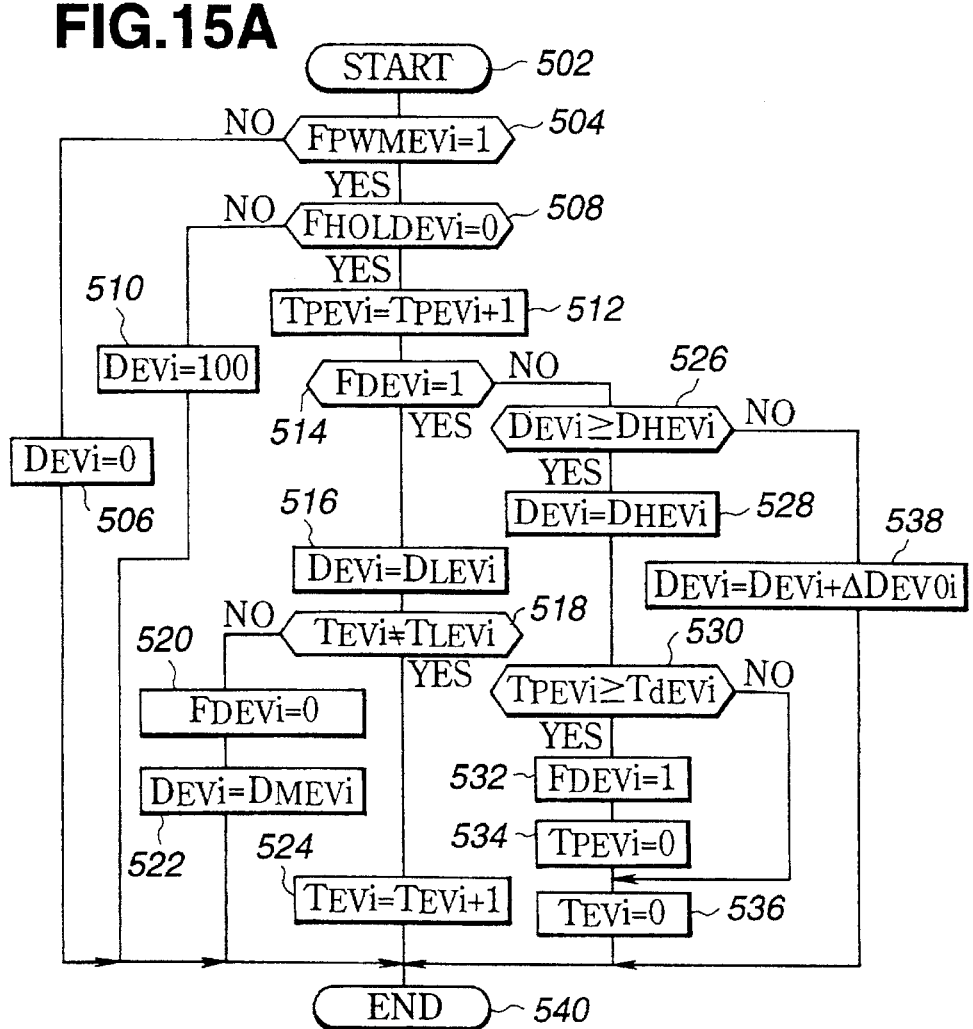
FIG. 15A is a flow diagram showing the programing of the digital computer as it is used to set the duty ratio of the electric current EV supplied to the first solenoid valve of the actuator.

FIG. 15A is a flow diagram illustrating the programming of the digital computer as it is used to set the duty ratio $D_{EVi}$ of the control signal EVi applied to the first solenoid valve 8. At the point 502, the computer program is entered at uniform intervals of time $\Delta T_{EVi}$, for example, 1 msec, much shorter than the interval of time $\Delta T$ of execution of the program of FIG. 5. At the point 504, a determination is made as to whether or not the first solenoid valve PWM control permission flag $F_{PWMEVi}$ is set at 1. If the answer to this question is "YES", then the program proceeds to the point 508. Otherwise, the program proceeds to the point 506 where the first solenoid valve duty ratio $D_{EVi}$ is set at 0% in order to hold the first solenoid valve 8 in its open position. This first solenoid valve duty ratio $D_{EVi}$ is stored in the computer memory 20c. Following this, the program proceeds to the end point 540.

At the point 508 in the program, a determination is made as to whether or not the first solenoid valve pressure holding control flag $F_{HOLDEVi}$ is cleared to 0. If the answer to this question is "YES", then the program proceeds to the point 512. Otherwise, the program proceeds to the point 510 where the first solenoid valve duty ratio $D_{EVi}$ is set at 100% in order to hold the first solenoid valve 8 in its closed position. This first solenoid valve duty ratio $D_{EVi}$ is stored in the computer memory 20c. Following this, the program proceeds to the end point 540.

At the point 512 in the program, the pressure increasing cycle timer $T_{PEVi}$ is incremented by one step. At the point 514, a determination is made as to whether or not a first solenoid valve duty ratio decrease permission flag $F_{DEVi}$ is set at 1. If the answer to this question is "YES", then the program proceeds to the point 516 where the first solenoid valve duty ratio $D_{EVi}$ is set at the first solenoid valve open side duty ratio $D_{LEVi}$. This duty ratio $D_{EVi}$ is stored in the computer memory 20c. Following this, the program proceeds to a determination step at the point 518. This determination is as to whether or not a pressure increase timer count $T_{EVi}$ is not equal to the pressure increasing period $T_{LEVi}$. If the answer to this question is "NO", then it means that this timer has counted up for the pressure increasing period $T_{LEVi}$ and the program proceeds to the point 520 where the first solenoid valve duty ratio decrease permission flag $F_{DEVi}$ is cleared to zero and then to the point 522 where the first solenoid valve duty ratio $D_{EVi}$ is set at a predetermined intermediate duty ratio value $D_{MEVi}$. The intermediate duty ratio value $D_{MEVi}$ is set substantially at a value intermediate the open and closed side duty ratios $D_{LEVi}$ and $D_{HEVi}$, that is, at the center of the effective duty ratio range as shown in FIG. 8B. Following this, the program proceeds to the end point 540. If the answer to the question inputted at the point 518 is "YES", then the program proceeds to the point 524 where the pressure increase timer $T_{EVi}$ is incremented by one step and then to the end point 540.

If the answer to the question inputted at the point 514 is "NO", then the program proceeds to another determination step at the point 526. This determination is as to whether or not the first solenoid valve duty ratio $D_{EVi}$ is equal to or greater than the predetermined closed side duty ratio $D_{HEVi}$. If the answer to this question is "YES", then the program proceeds to the point 528 where the first solenoid valve duty ratio $D_{EVi}$ is set at the predetermined closed side duty ratio $D_{HEVi}$. This duty ratio $D_{EVi}$ is stored in the computer memory 20c. Following this, the program proceeds to a determination step at the point 530. This determination is as to whether or not the pressure increasing cycle timer count $T_{PEVi}$ is equal to or greater than a predetermined pressure increase value $T_{dEVi}$. If the answer to this question is "YES", then the program proceeds to the point 532 where the first solenoid valve duty ratio decrease permission flag $F_{DEVi}$ is set at 1, and then to the point 534 where the pressure increasing cycle timer $T_{PEVi}$ is cleared to 0, and then to the point 536. Otherwise, the program proceeds directly to the point 536 where the pressure increase timer $T_{EVi}$ is cleared to 0. Following this, the program proceeds to the end point 540.

If the answer to the question inputted at the point 526 is "NO", then the program proceeds to the point 538 where the first solenoid valve duty ratio $D_{EVi}$ is calculated by adding a predetermined positive duty ratio decrease value $\Delta D_{EVOi}$ to the last value of the duty ratio $D_{EVi}$. The calculated duty ratio $D_{EVi}$ is stored in the computer memory 20c. Following this, the program proceeds to the end point 540.

Figure 16A:
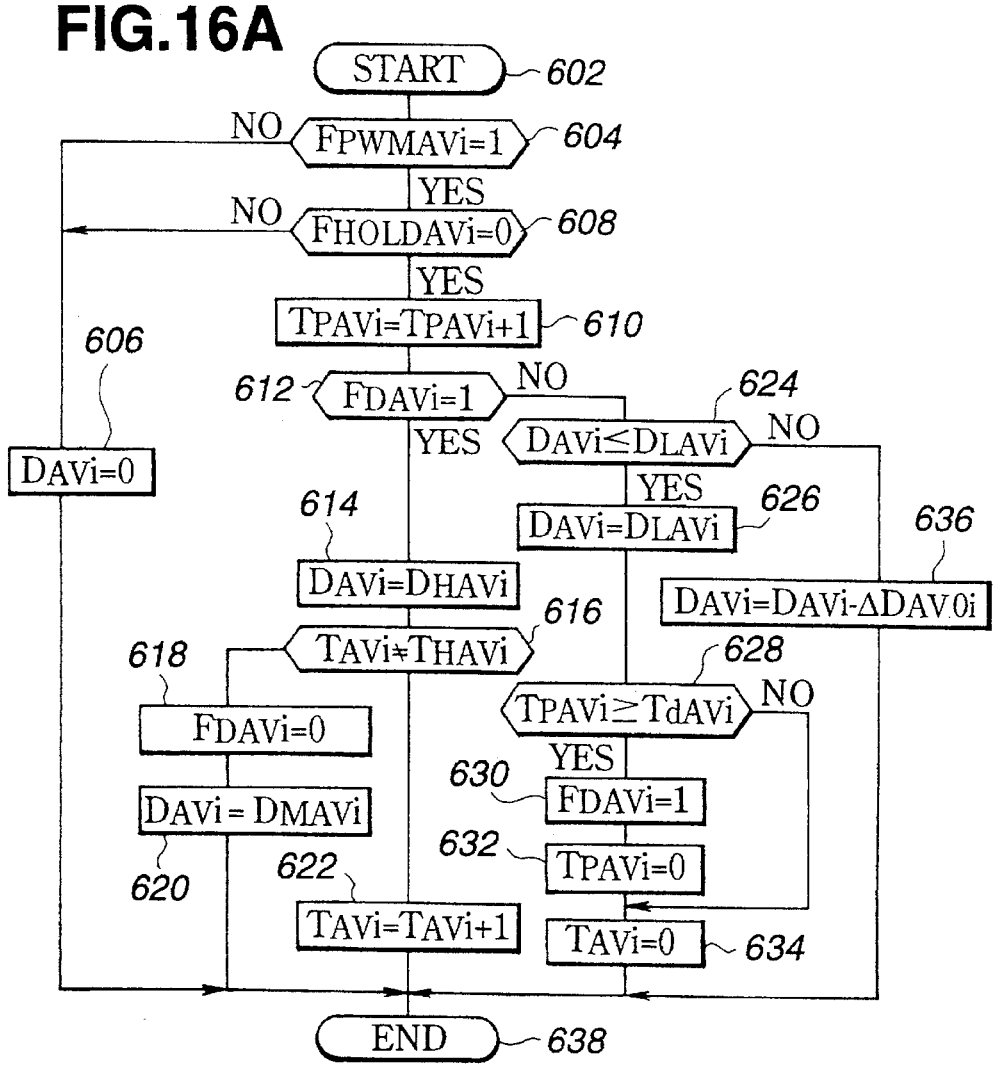
FIG. 16A is a flow diagram showing the programming of the digital computer as it is used to set the duty ratio of the electric current AV supplied to the second solenoid valve of the actuator.

FIG. 16A is a flow diagram illustrating the programming of the digital computer as it is used to set the duty ratio $D_{AVi}$ of the control signal AVi applied to the second solenoid valve 9. At the point 602, the computer program is entered at uniform intervals of the $\Delta T_{AVi}$, for example, 1 msec, much shorter than the interval of time $\Delta T$ of execution of the program of FIG. 5. At the point 604, a determination is made as to whether or not the second solenoid valve PWM control permission flag $F_{PWMAVi}$ is set at 1. If the answer to this question is "YES", then the program proceeds to the point 608. Otherwise, the program proceeds to the point 606 where the second solenoid valve duty ratio $D_{AVi}$ is set at 0% in order to hold the second solenoid valve 9 in its closed position. This second solenoid valve duty ratio $D_{AVi}$ is stored in the computer memory 20c. Following this, the program proceeds to the end point 638.

At the point 608 in the program, a determination is made as to whether or not the second solenoid valve pressure holding control flag $F_{HOLDAVi}$ is cleared to 0. If the answer to this question is "YES", then the program proceeds to the point 610. Otherwise, the program proceeds to the point 606. At the point 610 in the program, the pressure decreasing cycle timer $T_{PAVi}$ is incremented by one step. At the point 612, a determination is made as to whether or not a second solenoid valve duty ratio increase permission flag $F_{DAVi}$ is set at 1. If the answer to this question is "YES", then the program proceeds to the point 614 where the second solenoid valve duty ratio $D_{AVi}$ is set at the second solenoid valve open side duty ratio $D_{HAVi}$. This duty ratio $D_{AVi}$ is stored in the computer memory 20c. Following this, the program proceeds to a determination step at the point 616. This determination is as to whether or not a pressure decrease timer count $T_{AVi}$ is not equal to the pressure decreasing period $T_{HAV_i}$. If the answer to this question is "NO", then it means that this timer has counted up for the pressure decreasing period $T_{HAV_i}$ and the program proceeds to the point 618 where the second solenoid valve duty ratio increase permission flag $F_{DAV_i}$ is cleared to zero and then to the point 620 where the second solenoid valve duty ratio $D_{AV_i}$ is set at a predetermined intermediate duty ratio value $D_{MAV_i}$. The intermediate duty ratio value $D_{MAV_i}$ is set substantially at a value intermediate the open and closed side duty ratios $D_{HAV_i}$ and $D_{LAV_i}$, that is, at the center of the effective duty ratio range. Following this, the program proceeds to the end point 638. If the answer to the question inputted at the point 616 is "YES", then the program proceeds to the point 622 where the pressure decrease timer $T_{AV_i}$ is incremented by one step and then to the end point 638.

If the answer to the question inputted at the point 612 is "NO", then the program proceeds to another determination step at the point 624. This determination is as to whether or not the second solenoid valve duty ratio $D_{AV_i}$ is equal to or less than the predetermined closed side duty ratio $D_{LAV_i}$. If the answer to this question is "YES", then the program proceeds to the point 626 where the second solenoid valve duty ratio $D_{AV_i}$ is set at the predetermined closed side duty ratio $D_{LAV_i}$. This duty ratio $D_{AV_i}$ is stored in the computer memory 20c. Following this, the program proceeds to a determination step at the point 628. This determination is as to whether or not the pressure decreasing cycle timer count $T_{PAV_i}$ is equal to or greater than a predetermined pressure decrease value $T_{dEV_i}$. If the answer to this question is "YES", then the program proceeds to the point 630 where the second solenoid valve duty ratio increase permission flag $F_{DAV_i}$ is set at 1, and then to the point 632 where the pressure decreasing cycle timer $T_{PAV_i}$ is cleared to 0, and then to the point 634. Otherwise, the program proceeds directly to the point 634 where the pressure decrease timer $T_{AV_i}$ is cleared to 0. Following this, the program proceeds to the end point 638.

If the answer to the question inputted at the point 624 is "NO", then the program proceeds to the point 636. At the point 636, the second solenoid valve duty ratio $D_{AV_i}$ is calculated by subtracting a predetermined positive duty ratio decrease value $\Delta D_{AVO_i}$ to the last value of the duty ratio $D_{AV_i}$. The calculated duty ratio $D_{AV_i}$ is stored in the computer memory 20c. Following this, the program proceeds to the end point 638.

The operation is as follows: When the wheel cylinder pressure holding mode is selected during the execution of the program of FIG. 14, both of the first and second solenoid valve pressure holding control flags $F_{HOLDEV_i}$ and $F_{HOLDAV_i}$ are set at 1 at the point 482 of FIG. 14, and both of the pressure decreasing and increasing cycle timers $T_{PAV_i}$ and $T_{PEV_i}$ are cleared to 0 at the point 484 of FIG. 14. The first solenoid valve duty ratio $D_{EV_i}$ is set at 100% and the second solenoid valve duty ratio $D_{AV_i}$ is set at 0% at the point 486 of FIG. 14. As a result, the actuator 6i is instructed to operate in the wheel cylinder pressure holding mode to interrupt the communication between the master cylinder 5 and the wheel cylinder 2i. Since the first solenoid valve PWM control permission flag $F_{PWMEV_i}$ is set at 1 and the first solenoid valve pressure holding control flag $F_{HOLDEV_i}$ is set at 1, the control is transferred through the points 504 and 508 of FIG. 15A to the point 510 of FIG. 15A where the first solenoid valve duty ratio $D_{EV_i}$ is at 100% to place the first solenoid valve 8 in its closed position. Since the second solenoid valve PWM control permission flag $F_{PWMAV_i}$ is set at 1 and the second solenoid valve pressure holding control flag $F_{HOLDAV_i}$ is set at 1, the control is transferred through the points 604 and 608 of FIG. 16A to the point 606 of FIG. 16A where the second solenoid valve duty ratio $D_{AV_i}$ is set at 0% to retain the second solenoid valve 9 in its closed position. As a result, the actuator 6i holds the wheel cylinder pressure Pi.

Figure 16B:
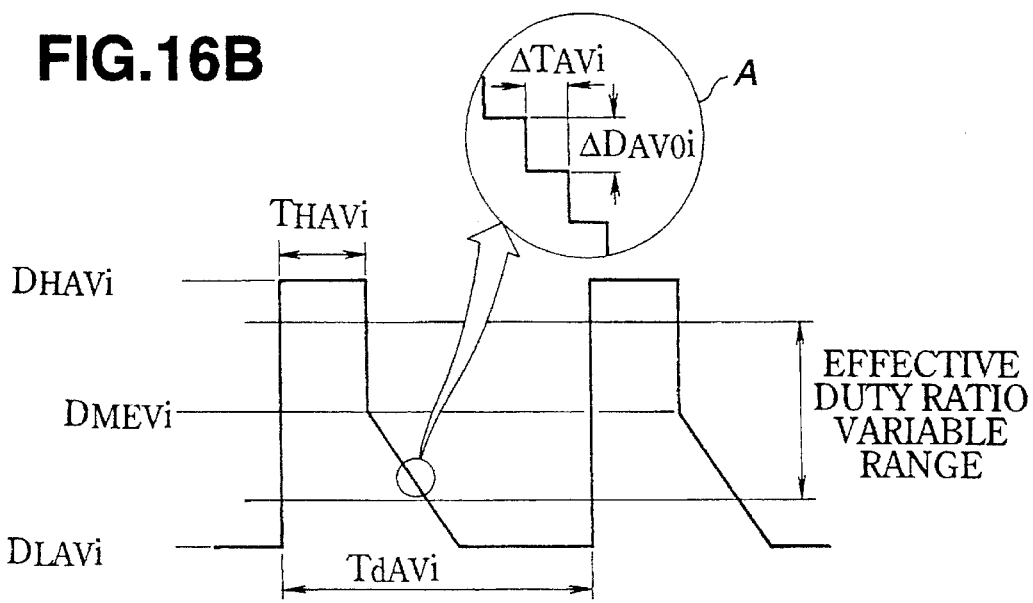
FIG. 16B is a graph used in explaining the second solenoid valve duty ratio changes made during the wheel cylinder pressure decreasing mode.

When the wheel cylinder pressure decreasing mode is selected during the execution of the program of FIG. 14, the second solenoid valve pressure holding control flag $F_{HOLDAV_i}$ is cleared 0 and the first solenoid valve pressure holding control flag $F_{HOLDEV_i}$ is set at 1 at the point 474 of FIG. 14. The pressure decreasing cycle timer $T_{PAV_i}$ is set at the predetermined value $T_{dAV_i}$ and the pressure increasing cycle timer $T_{PEV_i}$ is cleared to 0 at the point 476 of FIG. 14. At the point 478 of FIG. 14, the first solenoid valve duty ratio $D_{EV_i}$ is Set at 100%, the second solenoid valve duty ratio $D_{AV_i}$ is set at the predetermined open side value $D_{HAV_i}$, and the second solenoid valve duty ratio decrease permission flag $F_{DAV_i}$ is set at 1 at the point 478 of FIG. 14. As a result, the actuator 6i is instructed to operate in the wheel cylinder pressure decreasing mode. During this pressure decreasing mode, the control signal MRi is applied from the drive circuit 22ci to operate the electric motor 10 to discharge fluid pressure from the wheel cylinder 2i to the reservoir 12. Since the first solenoid valve PWM control permission flag $F_{PWMEV_i}$ is set at 1 and the first solenoid valve pressure holding control flag $F_{HOLDEV_i}$ is set at 1, the control is transferred through the points 504 and 508 of FIG. 15A to the point 510 of FIG. 15A where the first solenoid valve duty ratio $D_{EV_i}$ is set at 100% to place the first solenoid valve 8 in its closed position. Since the second solenoid valve PWM control permission flag $F_{PWMAV_i}$ is set at 1, whereas the second solenoid valve pressure holding control flag $F_{HOLDAV_i}$ is set at 0, the control is transferred through the points 604 and 608 of FIG. 16A to the point 610 of FIG. 16A. Since the second solenoid valve duty ratio decrease permission flag $F_{DAV_i}$ is set at 1, then, the control is transferred through the point 612 of FIG. 16A to the point 614 of FIG. 16A where the second solenoid valve duty ratio $D_{AV_i}$ is set at the second solenoid valve open side duty ratio $D_{HAV_i}$. That is, the second solenoid duty ratio value $D_{AV_i}$ changes to the second solenoid valve open side duty ratio $D_{HAV_i}$, as shown in FIG. 16B, just after the wheel cylinder pressure decreasing mode is selected. The second solenoid valve open side duty ratio $D_{HAV_i}$ is set at a value greater than the upper limit of the effective duty ratio variable range and the second solenoid valve closed side duty ratio $D_{HAV_i}$ is set at a value smaller than the lower limit of the effective duty ratio variable range; as shown in FIG. 16B. This is effective to prevent the second solenoid valve 9 from remaining before its fully open or closed position even when the second solenoid valve duty ratio is set at the open or closed side duty ratio. This condition is referred to as an opening degree increasing phase. The second solenoid valve duty ratio $D_{AV_i}$ remains at the open side duty ratio $T_{HAV_i}$ for the pressure decreasing period of time $T_{HAV_i}$, as shown in FIG. 16B, by the steps at the points 630 and 632 of FIG. 16A. This condition is referred to as a first opening degree retaining phase. Thus, the second solenoid valve duty ratio $D_{AV_i}$ remains at the open side duty ratio $D_{HAV_i}$ for the period $T_{HAV_i}$, as shown in FIG. 16B, so that the second solenoid valve 9 is held substantially in its open position to cause a wheel cylinder pressure decrease corresponding to the pressure decreasing period $T_{HAV_i}$. When the pressure decrease timer $T_{AV_i}$ is timed out for the pressure decreasing period $T_{HAV_i}$, the second solenoid valve duty ratio decrease permission flag $F_{DAV_i}$ is cleared to zero at the point 618 of FIG. 16A and then the second solenoid valve duty ratio $D_{AVi}$ is set at the intermediate duty ratio $D_{MAVi}$. As a result, the second solenoid valve duty ratio $D_{AVi}$ decreases from the open side value $D_{HAVi}$ to the intermediate value $D_{MAVi}$, as shown in FIG. 16B. This condition is referred to as a first opening degree decreasing phase. Thereafter, the control is transferred through the point 612 of FIG. 16A to the point 624 of FIG. 16A since the second solenoid valve duty ratio decrease permission flag $F_{DAVi}$ is cleared to zero at the point 618 of FIG. 16A and then through the point 624 of FIG. 16A to the point 636 of FIG. 16A. That is, the second solenoid valve duty ratio $D_{AVi}$ is decreased by the predetermined value $\Delta D_{AVOi}$ for each cycle of execution of the program of FIG. 16A, as shown in the enlarged view enclosed in the circle A of FIG. 16B. As a result, the second solenoid valve 9 moves toward its closed position. This condition is referred to as a second opening degree decreasing phase and it continues until the second solenoid valve duty ratio $D_{AVi}$ reaches the closed side duty ratio $D_{LAVi}$. When the second solenoid valve duty ratio $D_{AVi}$ reaches the closed side duty ratio $D_{LAVi}$, the control is transferred through the point 624 of FIG. 16A to the point 626 of FIG. 16A where the second solenoid valve duty ratio $D_{AVi}$ is maintained at the predetermined closed side duty ratio $D_{LAVi}$. This condition is referred to as a second opening degree retaining phase and it continues until the pressure decreasing cycle timer $T_{PAVi}$ is timed out for the pressure decreasing period $T_{dAVi}$. Thus, the second solenoid valve duty ratio $D_{AVi}$ remains at the closed side duty ratio $D_{LAVi}$ and the second solenoid valve 9 remains substantially in its closed position to hold the wheel cylinder pressure Pi. This cycle, which includes the opening degree increasing phase, the first opening degree retaining phase, the first opening degree decreasing phase, the second opening degree decreasing phase and the second opening degree retaining phase, is repeated at intervals of time $T_{dAVi}$, as shown in FIG. 16B, to decrease the wheel cylinder pressure Pi.

Figure 15B:
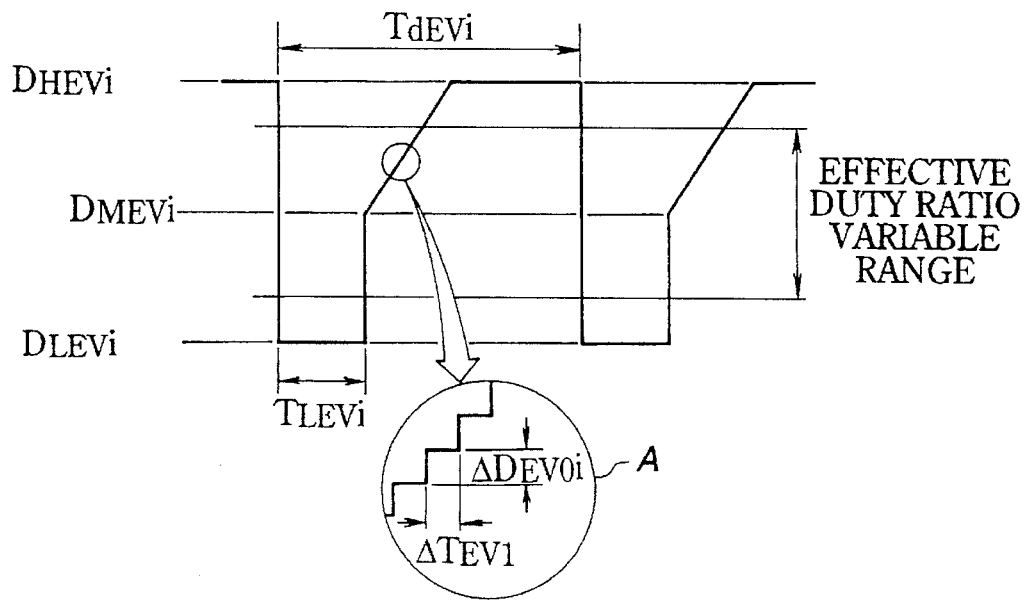
FIG. 15B is a graph used in explaining the first solenoid valve duty ratio changes made during the wheel cylinder pressure increasing mode.

When the wheel cylinder pressure increasing mode is selected during the execution of the program of FIG. 14, the second solenoid valve pressure holding control flag $F_{HOLDAVi}$ is set at 1 and the first solenoid valve pressure holding control flag $F_{HOLDEVi}$ is cleared to 0 at the point 488 of FIG. 14. The pressure decreasing cycle timer $T_{PAVi}$ is set at 0 and the pressure increasing cycle timer $T_{PEVi}$ is set at the predetermined value $T_{dEVi}$ at the point 490 of FIG. 14. Then, the first solenoid valve duty ratio $D_{EVi}$ is set at the predetermined open side value $D_{LEVi}$, the second solenoid valve duty ratio $D_{AVi}$ is set at 0, and the first solenoid valve duty ratio increase permission flag $F_{DEVi}$ is set at 1 at the point 492 of FIG. 14. As a result, the actuator 6i is instructed to operate in the pressure increasing mode. Since the second solenoid valve PWM control permission flag $F_{PWMAVi}$ is set at 1 and the second solenoid valve pressure holding control flag $F_{HOLDAVi}$ is set at 1, the control is transferred through the points 364 and 608 of FIG. 16A to the point 606 of FIG. 16A where the second solenoid valve duty ratio $D_{AVi}$ is at 0% to place the second solenoid valve 9 in its closed position. Since the first solenoid valve PWM control permission flag $F_{PWMEVi}$ is set at 1, the first solenoid valve pressure holding control flag $F_{HOLDEVi}$ is set at 0, and the first solenoid valve duty ratio increase permission flag $F_{DEVi}$ is set at 1, the control is transferred through the points 504, 588, 512 and 516 of FIG. 15A to the point 516 of FIG. 15A where the first solenoid valve duty ratio $D_{EVi}$ is set at its open side value $D_{LEVi}$. That is, the first solenoid valve duty ratio $D_{EVi}$ changes to the first solenoid valve open side duty ratio $D_{LEVi}$, as shown in FIG. 15B, just after the wheel cylinder pressure increasing mode is selected. The first solenoid valve closed side duty ratio $D_{HEVi}$ is set at a value greater than the upper limit of the effective duty ratio variable range and the first solenoid valve open side duty ratio $D_{LAVi}$ is set at a value smaller than the lower limit of the effective duty ratio variable range, as shown in FIG. 15B. This is effective to prevent the first solenoid valve 8 from remaining before the fully closed or open position even when the first solenoid valve duty ratio is set at the closed or open side duty ratio. This condition is referred to as an opening degree decreasing phase. The first solenoid valve duty ratio $D_{EVi}$ remains at its open side duty ratio $T_{LEVi}$ for the pressure increasing period of time $T_{LEVi}$, as shown in FIG. 15B, by the steps at the points 518 and 524 of FIG. 15A. This condition is referred to as a first opening degree retaining phase. Thus, the first solenoid valve duty ratio $D_{EVi}$ remains at the open side duty ratio $D_{LEVi}$ for the period $T_{LEVi}$, as shown in FIG. 15B, so that the first solenoid valve 8 is held substantially in its open position to cause a wheel cylinder pressure increase corresponding to the pressure increasing period $T_{LEVi}$. When the pressure increase timer $T_{EVi}$ is timed out for the pressure decreasing period $T_{LEVi}$, the first solenoid valve duty ratio increase permission flag $F_{DEVi}$ is cleared to zero at the point 520 of FIG. 15A and then the first solenoid valve duty ratio $D_{EVi}$ is set at the intermediate duty ratio $D_{MEVi}$. As a result, the first solenoid valve duty ratio $D_{EVi}$ increases from the open side value $D_{LEVi}$ to the intermediate value $D_{MEVi}$, as shown in FIG. 15B. This condition is referred to as a first opening degree increasing phase. Thereafter, the control is transferred through the point 514 of FIG. 15A to the point 526 of FIG. 15A since the first solenoid valve duty ratio increase permission flag $F_{DEVi}$ is cleared to zero at the point 520 of FIG. 15A and then through the point 526 of FIG. 15A to the point 538 of FIG. 15A. That is, the first solenoid valve duty ratio $D_{EVi}$ is increased by the predetermined value $\Delta D_{EVOi}$ for each cycle of execution of the program of FIG. 15A, as shown in the enlarged view enclosed in the circle A of FIG. 15B. As a result, the first solenoid valve 8 moves toward its closed position. This condition is referred to as a second opening degree increasing phase and it continues until the first solenoid valve duty ratio $D_{EVi}$ reaches the closed side duty ratio $D_{HEVi}$. When the first solenoid valve duty ratio $D_{EVi}$ reaches the closed side duty ratio $D_{HEVi}$, the control is transferred through the point 526 of FIG. 15A to the point 528 of FIG. 15A where the first solenoid valve duty ratio $D_{EVi}$ is maintained at the predetermined closed side duty ratio $D_{HEVi}$. This condition is referred to as a second opening degree retaining phase and it continues until the pressure increasing cycle timer $T_{PEVi}$ is timed out for the pressure increasing period $T_{dEVi}$. Thus, the first solenoid valve duty ratio $D_{EVi}$ remains at the closed side duty ratio $D_{HEVi}$ and the first solenoid valve 8 remains substantially in its closed position to hold the wheel cylinder pressure Pi. This cycle, which includes the opening degree decreasing phase, the first opening degree retaining phase, the first opening degree increasing phase, the second opening degree increasing phase and the second opening degree retaining phase, is repeated at intervals of time $T_{dAVi}$, as shown in FIG. 15B, to increase the wheel cylinder pressure Pi.

Figures 17A, 17B:
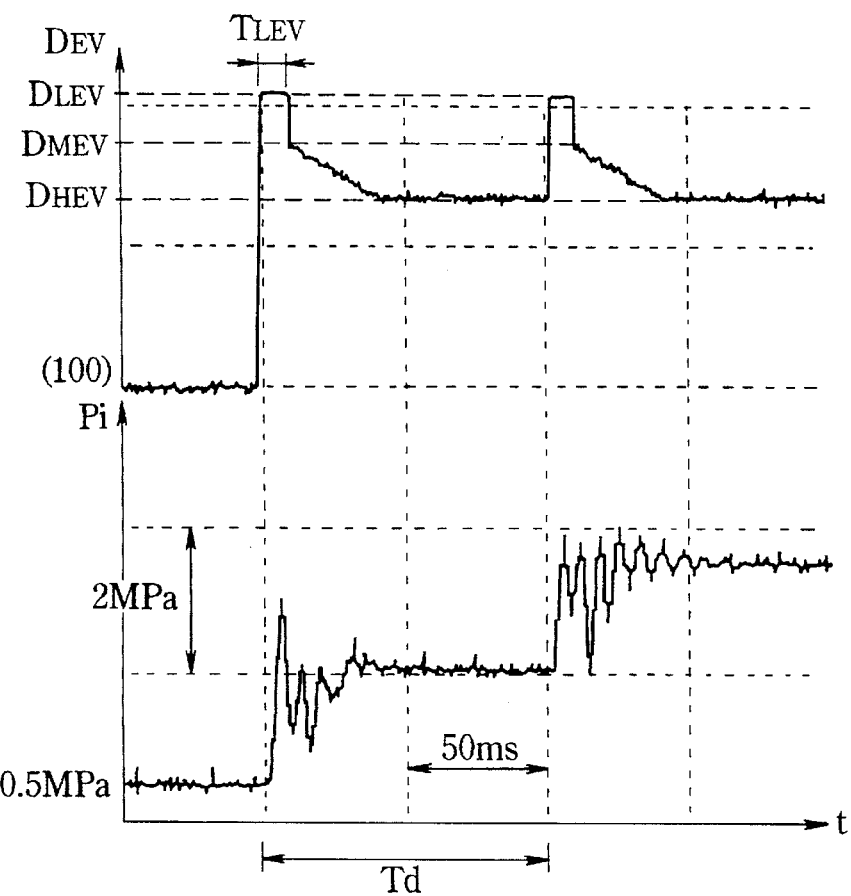
FIG. 17A is a graph showing the first solenoid valve duty ratio variations.
FIG. 17B is a graph showing the wheel cylinder pressure variations made with the first solenoid valve duty ratio variations shown in FIG. 17A.

FIG. 17A shows variations in the duty ratio $D_{EVi}$ of the control signal EVi applied to the first solenoid valve 8 during the execution of the program of FIG. 15A. FIG. 17B shows variations in the wheel cylinder pressure Pi corresponding to the first solenoid valve duty ratio variations of FIG. 17A. It can be seen from FIG. 17A that almost no pulsation occurs in the wheel cylinder pressure Pi particularly when the first solenoid valve 8 closes.

In general, the wheel cylinder pressure pulsations are greater after the solenoid valve closes than after the solenoid valve opens. The invention minimizes the wheel cylinder pressure pulsations which may occur after the solenoid valve closes by decreasing the gradient, that is, the rate at which the solenoid valve moves in the closing direction. In this modification, the first solenoid valve duty ratio $D_{EVi}$ is increased at a fast rate during the first opening degree decreasing phase and at a slow rate during the second opening degree decreasing phase subsequent to the first opening degree decreasing phase, as shown in FIG. 15B. This is effective to improve the wheel cylinder pressure increasing control accuracy. Similarly, the second solenoid valve duty ratio $D_{AVi}$ is decreased at a fast rate during the first opening degree decreasing phase and at a slow rate during the second opening degree decreasing phase subsequent to the first opening degree decreasing phase, as shown in FIG. 16B. This is effective to improve the wheel cylinder pressure decreasing accuracy.

The first solenoid value duty ratio $D_{EVi}$ is decreased at a fast rate during the opening degree increasing phase, as shown in FIG. 15B. Similarly, the second solenoid valve duty ratio $D_{AVi}$ is increased at a fast rate during the opening degree increasing phase, as shown in FIG. 16B. This is effective to improve the wheel cylinder pressure control response speed.

While the invention has been described in connection with an antiskid control apparatus provided for a front-engine, rear-drive type automotive vehicle, it is to be understood that the invention is equally applicable to an antiskid and/or traction control apparatus for use with automotive vehicles of the rear wheel drive, front wheel drive, four wheel drive and other types.

What is claimed is:

1. A braking force control apparatus for use with an automotive vehicle supported on road wheels each of which has a wheel cylinder for applying a braking force to the corresponding road wheel in response to a fluid pressure introduced thereto, comprising:

at least one solenoid valve movable between open and closed positions in response to a control signal having a variable duty ratio for controlling the fluid pressure introduced to the wheel cylinder;

sensor means for sensing a road wheel slip condition; and a control unit for controlling the solenoid valve based on the sensed road wheel slip condition, the control unit including means for changing the duty ratio of the control signal at predetermined intervals of time to move the solenoid valve in a plurality of steps toward the closed position during a valve closing mode.

2. The braking force control apparatus as claimed in claim 1, wherein the control unit includes means for setting the duty ratio of the control signal at an intermediate value to move the solenoid valve to a position substantially intermediate the open and closed positions at a first stage of the valve closing mode, and means for setting the duty ratio of the control signal at predetermined intervals of time to move the solenoid valve in a plurality of steps toward the closed position during a second stage of the valve closing mode subsequent to the first stage of the valve closing mode.

3. The braking force control apparatus as claimed in claim 2, wherein the control unit includes means for setting the duty ratio of the control signal to move the solenoid valve at a fast rate during a valve opening mode.

4. The braking force control apparatus as claimed in claim 1, wherein the control unit includes means for changing the duty ratio of the control signal at predetermined intervals of time to move the solenoid valve in a plurality of steps toward the open position during a valve opening mode.

5. The braking force control apparatus as claimed in claim 4, wherein the control unit includes means for setting a first rate at which the duty ratio of the control signal changes during the valve closing mode at a smaller value than a second rate at which the duty ratio of the control signal changes during the valve opening mode.

* * * * *